(12) United States Patent
Nikseresht Ghanepour et al.

(10) Patent No.: US 11,292,027 B2
(45) Date of Patent: *Apr. 5, 2022

(54) PROCESSES FOR PRODUCING EFFECT LAYERS

(71) Applicant: SICPA HOLDING SA, Prilly (CH)

(72) Inventors: Neda Nikseresht Ghanepour, Le Mont-sur-Lausanne (CH); Evgeny Loginov, Renens (CH); Mathieu Schmid, Lausanne (CH); Claude-Alain Despland, Prilly (CH); Edgar Muller, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 56 days.

This patent is subject to a terminal disclaimer.

(21) Appl. No.: 16/312,977

(22) PCT Filed: Aug. 14, 2017

(86) PCT No.: PCT/EP2017/070574
§ 371 (c)(1),
(2) Date: Dec. 21, 2018

(87) PCT Pub. No.: WO2018/033512
PCT Pub. Date: Feb. 22, 2018

(65) Prior Publication Data
US 2019/0217335 A1 Jul. 18, 2019

(30) Foreign Application Priority Data
Aug. 16, 2016 (EP) .................................. 16184326.3

(51) Int. Cl.
*B05D 3/00* (2006.01)
*B05D 3/06* (2006.01)

(52) U.S. Cl.
CPC ............. *B05D 3/207* (2013.01); *B05D 3/065* (2013.01)

(58) Field of Classification Search
CPC .... B42D 25/29; B42D 25/369; B42D 25/378; B05D 5/61; B05D 5/63; B05D 5/66;
(Continued)

(56) References Cited
U.S. PATENT DOCUMENTS
2,418,479 A 4/1947 Pratt et al.
2,570,856 A 10/1951 Pratt et al.
(Continued)

FOREIGN PATENT DOCUMENTS
CA 2161816 5/1996
CA 2574140 7/2007
(Continued)

OTHER PUBLICATIONS
Dockument#1 https://it.wikipedia.org/wiki/Plastoferrite (Year: NO).*
(Continued)

*Primary Examiner* — Tabassom Tadayyon Eslami
(74) *Attorney, Agent, or Firm* — Muncy, Geissler, Olds & Lowe, P.C.

(57) ABSTRACT

The invention relates to the field of the protection of security documents such as for example banknotes and identity documents against counterfeit and illegal reproduction. In particular, the present invention provides processes for magnetically transferring one or more indicia into a not yet hardened coating layer made of a coating composition comprising platelet-shaped magnetic or magnetizable pigment particles so as to produce optical effect layers (OELs) as anti-counterfeit means on security documents or security articles or for decorative purposes.

17 Claims, 15 Drawing Sheets

(58) Field of Classification Search
CPC . B05D 5/06; B05D 3/207; B05D 5/65; B41M 3/14

See application file for complete search history.

(56) References Cited

U.S. PATENT DOCUMENTS

| | | | |
|---|---|---|---|
| 3,676,273 | A | 7/1972 | Graves |
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A * | 5/1997 | Kashiwagi ............ B05D 3/207 118/623 |
| 5,697,649 | A * | 12/1997 | Dames ................. D21H 21/48 162/140 |
| 6,103,361 | A | 8/2000 | Batzar et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 10,610,888 | B2 * | 4/2020 | Nikseresht Ghanepour ................ B42D 25/369 |
| 2002/0160194 | A1 | 10/2002 | Phillips et al. |
| 2002/0182383 | A1 * | 12/2002 | Phillips ................ C09C 1/0024 428/199 |
| 2004/0009308 | A1 | 1/2004 | Schlaf et al. |
| 2006/0150854 | A1 * | 7/2006 | Benninger ............... B32B 5/16 101/489 |
| 2011/0290129 | A1 * | 12/2011 | Gygi .................... B41M 7/0036 101/150 |
| 2012/0162344 | A1 | 6/2012 | Raksha et al. |
| 2013/0189454 | A1 * | 7/2013 | Raksha ................ B05D 5/061 428/29 |
| 2014/0077485 | A1 * | 3/2014 | Raksha ............... H01F 41/0253 283/67 |
| 2014/0290512 | A1 * | 10/2014 | Raksha ................ H01F 7/0278 101/212 |

FOREIGN PATENT DOCUMENTS

| | | |
|---|---|---|
| CN | 101003224 A | 7/2007 |
| CN | 101375353 | 2/2009 |
| DE | 2006848 | 9/1971 |
| EP | 0406667 | 1/1995 |
| EP | 0710508 | 5/1996 |
| EP | 0686675 | 2/1998 |
| EP | 1666546 | 6/2006 |
| EP | 1710756 | 10/2006 |
| EP | 1787728 | 5/2007 |
| EP | 1641624 | 4/2008 |
| EP | 1986200 | 10/2008 |
| EP | 1990208 | 11/2008 |
| EP | 1937415 | 4/2009 |
| EP | 2157141 | 2/2010 |
| EP | 1519794 | 12/2010 |
| EP | 2402401 | 1/2012 |
| EP | 2155498 | 3/2014 |
| GB | 1475352 * | 6/1977 |
| JP | 201042407 | 2/2010 |
| JP | 2010526683 | 5/2010 |
| WO | 2002073250 | 9/2002 |
| WO | 2002090002 | 11/2002 |
| WO | 2003000801 | 1/2003 |
| WO | 2005002866 | 1/2005 |
| WO | 2006061301 | 6/2006 |
| WO | 2006063926 | 6/2006 |
| WO | 2007131833 | 11/2007 |
| WO | 2008046702 | 4/2008 |
| WO | 2008139373 | 11/2008 |
| WO | 2010058026 | 5/2010 |
| WO | 2014/108404 * | 7/2014 |
| WO | 2015/086257 * | 6/2015 |
| WO | 2015086257 * | 6/2015 |
| WO | 2016083259 | 6/2016 |

OTHER PUBLICATIONS

The Printing ink manual, R.H. Leach and R.J. Pierce, Springer Edition, 5th Edition, 2008, pp. 58-62.
Printing Technology, J.M. Adams and P.A. Dolin, Delmar Thomson Learning, 5th Edition, 2002, pp. 293-328.
"Handbook of print media", Helmut Kipphan, Springer Edition, 2001, p. 48.
The Printing ink manual, R.H. Leach and R.J. Pierce, Springer Edition, 5th Edition, 2008, pp. 42-51.
Printing Technology, J. M. Adams and P.A. Dolin, Delmar Thomson Learning, 5th Edition, 2002, pp. 359-360.
The Printing ink manual, R.H. Leach and R.J. Pierce, Springer Edition, 5th Edition, 2008, pp. 33-42.
DIN 5036-3 (Nov. 1979, 1979, 27 pages.
IEC 60404-1, 2000, 118 pages.
Magnetic Materials, Fundamentals and Applications, 2nd Ed., Nicola A. Spaldin, p. 16-17, Cambridge University Press, 2011.
Handbook of Condensed Matter and Materials Data, Chap. 4.3.2, Soft Magnetic Materials, p. 758-793, and Chap. 4.3.4, Magnetic Oxides, p. 811-813, Springer 2005.
Ferromagnetic Materials, vol. 1, Iron, Cobalt and Nickel, p. 1-70, Elsevier 1999.
Ferromagnetic Materials, vol. 2, Chap. 2, Soft Magnetic Metallic Materials, p. 55-188, and Chap. 3, Ferrites for non-microwave Applications, p. 189-241, Elsevier 1999.
Electric and Magnetic Properties of Metals, C. Moosbrugger, Chap. 8, Magnetically Soft Materials, p. 196-209, ASM International, 2000.
Handbook of modern Ferromagnetic Materials, Chap. 9, High-permeability High-frequency Metal Strip, p. 155-182, Kluwer Academic Publishers, 2002.
Smithells Metals Reference Book, Chap. 20.3, Magnetically Soft Materials, p. 20-9-20-16, Butterworth-Heinemann Ltd, 1992.
Z.Q. Zhu et al. D. Howe (Halbach permanent magnet machines and applications: a review, IEE. Proc. Electric Power Appl., 2001, 148, p. 299-308).
International Search Report and Written Opinion issued with respect to Application No. PCT/EP2017/070574, 11 pages.
Chinese Office Action in counterpart Chinese Application No. 201780037495.7 dated Jun. 2, 2021 (and English language translation of the Office Action, 5 pages.
Japanese Office Action in counterpart Japanese Application No. P2018-562240 dated Jun. 15, 2021 (and English language translation of the Office Action), 6 pages.

* cited by examiner

PROCESSES FOR PRODUCING EFFECT LAYERS

FIELD OF THE INVENTION

The present invention relates to the field of processes for producing optical effect layers (OELs) comprising magnetically oriented platelet-shaped magnetic or magnetizable pigment particles. In particular, the present invention provides processes for magnetically transferring one or more indicia into coating layers comprising platelet-shaped magnetic or magnetizable pigment particles so as to produce OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194 Now Abandoned; US 2004/0009308, now U.S. Pat. No. 6,871,528; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

EP 1 641 624 B1, EP 1 937 415 B1 and EP 2 155 498 B1 disclose devices and method for magnetically transferring indicia into a not yet hardened (i.e. wet) coating composition comprising magnetic or magnetizable pigment particles so as to form optical effect layers (OELs). The disclosed methods advantageously allow the production of security documents and articles having a customer-specific magnetic design.

EP 1 641 624 B1 discloses a device for magnetically transferring indicia corresponding to the design to be transferred into a wet coating composition comprising magnetic or magnetizable particles on a substrate. The disclosed device comprises a body of permanent-magnetic material being permanently magnetized in a direction substantially perpendicular to the surface of said body, wherein the surface of said body carries indicia in the form of engravings, causing perturbations of its magnetic field. The disclosed devices are well suited for transferring high-resolution patterns in high-speed printing processes such as those used in the field of security printing. However, and as described in EP 1 937 415 B1, the devices disclosed in EP 1 641 624 B1 may result in poorly reflecting optical effect layers having a rather dark visual appearance. The disclosed drawback of EP 1 641 624 B1 results from the mainly perpendicular orientation of the magnetic pigment particles with respect to the printed substrate plane over a large part of the oriented coating layer, as resulting from the perpendicular magnetization which is required in said device.

EP 1 937 415 B1 discloses an improved device for magnetically transferring indicia into a wet coating composition comprising magnetic or magnetizable pigment flakes on a substrate. The disclosed device comprises at least one magnetized magnetic plate having a first magnetic field and having surface relief, engravings or cut-outs on a surface thereof representing said indicia and at least one additional magnet having a second magnetic field, wherein the additional magnet is fixedly positioned adjacent to the magnetic plate so as to produce substantial overlap of their magnetic fields. The presence of the at least one additional magnet has the effect of flattening out the magnetic field lines generated by the at least one magnetized permanent-magnetic plate, resulting in a more appealing visual effect. While the disclosed device flattens out the magnetic field lines compared to prior art, the field lines remain essentially curved. The disclosed device may still lead to the undesirable appearance of large dark areas in the magnetically transferred image, in particular in zones where the magnetic field lines are substantially perpendicular to the substrate surface. EP 1 937 415 B1 does not teach how to produce an even distribution of pigment flake orientations that would result in strongly reflecting OEL that are particularly well suited to carry customer specific indicia.

The methods and devices described hereabove use magnetic assemblies to mono-axially orient magnetic pigment particles. Mono-axial orientation of magnetic pigment particles result in neighboring particles having their main (second longest) axis parallel to each other and to the magnetic field, while their minor axis in the plane of the pigment particles is not, or much less constrained by the applied magnetic field. Accordingly, a sole mono-axial orientation of magnetic pigment particles results in optical effect layers that may suffer from a low reflectivity and brightness as light is reflected in a wide range of directions, especially in directions that are substantially perpendicular to the magnetic field lines.

EP 2 155 498 B1 discloses a device for magnetically transferring indicia into a coating composition comprising magnetic or magnetizable particles on a substrate. The disclosed device comprises a body subjected to a magnetic field generated by electromagnetic means or permanent magnets, which body carries determined indicia in the form of engravings on a surface of the body. The disclosed body comprises at least one layer of material of high magnetic permeability in which said engravings are formed and wherein, in un-engraved regions of said layer of material of high magnetic permeability, the field lines of the magnetic field extend substantially parallel to the surface of said body inside the layer of material of high magnetic permeability. It is further disclosed that the device comprises a base plate of material of low magnetic permeability supporting the layer of material of high magnetic permeability, wherein said layer of material of high magnetic permeability is preferably deposited on the base plate by galvanization. EP 2 155 498 B1 further discloses that the main direction of the magnetic field lines may be changed during exposure of the layer comprising magnetic or magnetizable particles by rotating, advantageously by 360°, the magnetic field. In particular, EP 2 155 498 B1 discloses embodiments wherein permanent magnets are used instead of electromagnets and wherein the rotation of said permanent magnets may be performed by physical rotation of the magnets themselves. A drawback of the disclosed devices resides in the galvanization process since said process is cumbersome and needs special equipments. Moreover, a significant shortcoming of the disclosed invention is that the process relies on the physical rotation of the permanent magnets to achieve 360° rotation of the magnetic field. This is particularly cumbersome from an industrial point of view as it requires complex mechanical systems. Furthermore, rotating simple magnets as suggested produces essentially spherical pigment flake orientations as shown in the corresponding examples of EP 2 155 498 B1. Such orientations are not well suited to clearly reveal indicia with an eye-catching relief/3D effect, as the sphere-like effect is superimposed with the indicia. The only method that can be derived from the description to generate relatively flat rotating fields would be to rotate very large magnets, which is impractical. EP 2 155 498 B1 does not teach how to establish a practical industrial process to generate rotating magnetic fields that impart an appealing 3D/relief impression of the indicia.

WO 2015/086257 A1 discloses an improved method for producing an optical effect layer (OEL) on a substrate, said process comprising two magnetic orientation steps, said steps consisting of i) exposing a coating composition comprising platelet-shaped magnetic or magnetisable pigment particles to a dynamic, i.e. direction changing, magnetic field of a first magnetic-field-generating device so as to bi-axially orient at least a part of the platelet-shaped magnetic or magnetisable pigment particles and ii) exposing the coating composition to a static magnetic field of a second magnetic-field-generating device, thereby mono-axially re-orienting at least a part of the platelet-shaped magnetic or magnetisable pigment particles according to a design transferred by said second magnetic-field-generating device. WO 2015/086257 A1 provides an example where the second magnetic orientation step uses a second magnetic-field-generating device such as those described in EP 1 937 415 B1. Whereas the method disclosed in WO 2015/086257 A1 allows the production of optical effects layers exhibiting improved brightness and contrast compared to the prior art, the so-obtained optical effects layers may still suffer from a poorly reflecting visual appearance and does not teach how to impart an appealing 3D/relief impression to the indicia.

Therefore, a need remains for improved processes for magnetically transferring indicia so as to produce optical effect layers (OELs) exhibiting better reflecting visual appearance, wherein said processes should be reliable, easy to implement and able to work at a high production speed while allowing the production of OELs exhibiting not only an eye-catching relief and/or 3D effect but also a bright and well resolved appearance.

SUMMARY OF THE INVENTION

Accordingly, it is an object of the present invention to overcome the deficiencies of the prior art as discussed above. This is achieved by the provision of a process for producing an optical effect layer (OEL) exhibiting one or more indicia on a substrate (x10), said process comprising the steps of:

a) applying onto a substrate (x10) surface a coating composition comprising i) platelet-shaped magnetic or magnetizable pigment particles and ii) a binder material so as to form a coating layer (x20) on said substrate (x10), said coating composition being in a first state, b) forming an assembly (x00) comprising the substrate (x10) carrying the coating layer (x20) and one or more negative indicia or one or more positive indicia, wherein the substrate (x10) carrying the coating layer (x20) is arranged above the one or more negative indicia or one or more positive indicia, wherein the one or more negative indicia consist of a soft magnetic plate (x51) comprising one or more voids (x52) having the shape of the one or more negative indicia, the soft magnetic plate (x51) being either made of one or more metals, alloys or compounds of high magnetic permeability or being made of a composite comprising from about 25 wt-% to about 95 wt-% of soft magnetic particles dispersed in a non-magnetic material, the weight percents being based on the total weight of the composite, and the one or more positive indicia consist of an arrangement (x30) comprising one or more indicia (x52) placed on or attached to a non-magnetic holder (x40), said indicia being made of one or more metals, alloys or compounds of high magnetic permeability or made a the composite comprising from about 25 wt-% to about 95 wt-% of soft magnetic particles dispersed in a non-magnetic material, the weight percents being based on the total weight of the composite, c) moving the assembly (x00) comprising the substrate (120) carrying the coating layer (x20) and the one or more negative indicia or one or more positive indicia obtained under step b) through an inhomogeneous magnetic field of a static magnetic-field-generating device (x60) so as to bi-axially orient at least a part of the platelet-shaped magnetic or magnetizable pigment particles, and d) hardening the coating composition to a second state so as to fix the platelet-shaped magnetic or magnetizable pigment particles in their adopted positions and orientations.

In one preferred embodiment, the substrate (x10) carrying the coating layer (x20) is arranged above the one or more negative indicia or one or more positive indicia and the coating layer (x30) is the topmost layer of the assembly and is preferably exposed to the environment, i.e. is not covered by any other layer or material.

Also described herein are optical effect layers (OELs) produced by the process described herein and security documents as well as decorative elements and objects comprising one or more optical OELs described herein.

Also described herein are methods of manufacturing a security document or a decorative element or object, comprising a) providing a security document or a decorative element or object, and b) providing an optical effect layer such as those described herein, in particular such as those obtained by the process described herein, so that it is comprised by the security document or decorative element or object.

Also described herein are uses of the one or more negative indicia or one or more positive indicia described herein together with the static magnetic-field-generating device (x60) described herein for magnetically transferring one or more indicia into the coating layer applied to the substrate described herein and comprising i) the platelet-shaped magnetic or magnetizable pigment particles and ii) the binder material described herein in an unhardened state described herein.

The present invention provides a reliable and easy to implement process to magnetically transfer one or more indicia into a coating layer formed from a coating composition in a first state, i.e. not yet hardened (i.e. wet) state, wherein the platelet-shaped magnetic or magnetizable pigment particles are free to move and rotate within the binder material so as to form an optical effect layer (OEL) with an eye-catching relief and/or 3D effect after having hardened the coating layer to a second state wherein the orientation and position of the platelet-shaped magnetic or magnetizable pigment particles are fixed/frozen. The magnetic transfer of one or more indicia into the coating layer comprising platelet-shaped magnetic or magnetizable pigment particles on the substrate is carried out by forming an assembly comprising the substrate carrying the coating layer and the one or more negative indicia or one or more positive indicia described herein, in particular by placing the substrate carrying the coating layer above (i.e. on top of) the one or more negative indicia or one or more positive indicia, and moving said assembly through the inhomogeneous magnetic field of a static magnetic-field-generating device. By "inhomogeneous magnetic field", it is meant that along the path of motion followed by individual platelet-shaped magnetic or magnetizable pigment particles of the coating layer, the magnetic field lines change at least in direction within a plane which is fixed in the reference frame of the moving assembly. In this way, at least a part of the platelet-shaped magnetic or magnetizable pigment particles of the coating layer tend to align within said plane, resulting in a bi-axial orientation of said platelet-shaped magnetic or magnetizable particles, i.e. an orientation in which the two largest principal axes of said platelet-shaped pigment particles are constrained. During this bi-axial orientation, the one or more voids of the one or more negative indicia or the one or more positive indicia described herein affect the direction and/or intensity of the magnetic field generated by the static magnetic-field-generating device, thus affecting the orientation of the platelet-shaped magnetic or magnetizable pigment particles placed just above said one or more negative indicia or one or more positive indicia so as to produce the desired eye-catching relief and/or 3D effect. In a preferred embodiment, the plane described herein is parallel or substantially parallel to the plane of the OEL in the one or more areas which are not directly above said one or more negative indicia or one or more positive indicia, resulting in an orientation of at least a part of the platelet-shaped magnetic or magnetizable pigment particles that is parallel or substantially parallel to the substrate carrying the OEL. In another embodiment, the magnetic field along the path of motion vary within a plane or planes that form a non-zero angle with respect to the plane of the OEL, resulting in an orientation of at least a part of the platelet-shaped magnetic or magnetizable pigment particles which is essentially non-parallel to the substrate carrying the OEL. Once the desired effect is created in the not yet hardened (i.e. wet) coating layer, the coating composition is partly or completely hardened so as to permanently fix/freeze the relative position and orientation of the platelet-shaped magnetic or magnetizable pigment particles in the OEL.

Moreover, the process provided by the present invention is mechanically robust, easy to implement with an industrial high-speed printing equipment, without resorting to cumbersome, tedious and expensive modifications of said equipment.

BRIEF DESCRIPTION OF DRAWINGS

The optical effect layers (OEL) described herein and their production are now described in more detail with reference to the drawings and to particular embodiments, wherein FIG. 1A-1 schematically illustrates a negative indicium consisting of a soft magnetic plate (150) having a thickness (T) and comprising a void (151) having the shape of the indicium.

DETAILED DESCRIPTION

Definitions

Figures 1, 1A:
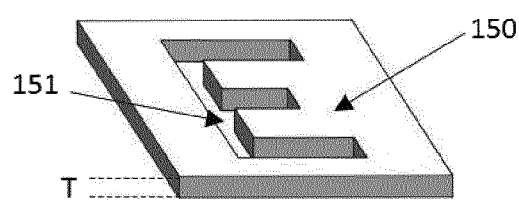
FIG. 1A-2 schematically illustrates an arrangement (130) comprising i) a negative indicium consisting of a soft magnetic plate (150) having a thickness (T) and comprising a void (151) having the shape of the indicium and ii) a non-magnetic holder (140).

The following definitions are to be used to interpret the meaning of the terms discussed in the description and recited in the claims.

As used herein, the indefinite article "a" indicates one as well as more than one and does not necessarily limit its referent noun to the singular.

As used herein, the term "at least" is meant to define one or more than one, for example one or two or three.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "optical effect layer (OEL)" as used herein denotes a coating or layer that comprises oriented platelet-shaped magnetic or magnetizable pigment particles and a binder, wherein said platelet-shaped magnetic or magnetizable pigment particles are oriented by a magnetic field and wherein the oriented platelet-shaped magnetic or magnetizable pigment particles are fixed/frozen in their orientation and position (i.e. after hardening/curing) so as to form a magnetically induced image.

The term "coating composition" refers to any composition which is capable of forming an optical effect layer (EOL) on a solid substrate and which can be applied preferably but not exclusively by a printing method. The coating composition comprises the platelet-shaped magnetic or magnetizable pigment particles described herein and the binder described herein.

As used herein, the term "wet" refers to a coating layer which is not yet cured, for example a coating in which the platelet-shaped magnetic or magnetizable pigment particles are still able to change their positions and orientations under the influence of external forces acting upon them.

As used herein, the term "indicia" shall mean discontinuous layers such as patterns, including without limitation symbols, alphanumeric symbols, motifs, letters, words, numbers, logos and drawings.

The term "hardening" is used to denote a process wherein the viscosity of a coating composition in a first physical state which is not yet hardened (i.e. wet) is increased so as to convert it into a second physical state, i.e. a hardened or solid state, where the platelet-shaped magnetic or magnetizable pigment particles are fixed/frozen in their current positions and orientations and can no longer move nor rotate.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The present invention provides a process for magnetically transferring one or more indicia into a not yet hardened (i.e. wet) coating layer made of a coating composition comprising platelet-shaped magnetic or magnetizable pigment particles on a substrate through the magnetic orientation of said pigment particles, said process comprises a step of moving the assembly comprising the substrate carrying the coating layer and the one or more negative indicia or one or more positive indicia through the inhomogeneous magnetic field of a static magnetic-field-generating device such that the magnetic field in the coating layer changes at least in direction with time so as to bi-axially orient at least a part of the platelet-shaped magnetic or magnetizable pigment particles. The magnetic orientation and position of the platelet-shaped magnetic or magnetizable pigment particles is fixed/frozen by hardening the coating composition so as to obtain bright and highly resolved optical effect layers (OELs) which further exhibit a striking 3D optical effect. The one or more indicia are transferred to the not yet hardened coating layer comprising the platelet-shaped magnetic or magnetizable pigment particles. The present invention provides said processes to obtain customer-specific bright and highly resolved optical effect layers (OELs) exhibiting a 3D striking appearance on a printed document or article in an easy-to-implement and highly reliable way.

The process according to the present invention comprises the steps of:
a) applying onto the substrate surface the coating composition comprising i) the platelet-shaped magnetic or magnetizable pigment particles described herein and ii) the binder material described herein so as to form a coating layer on said substrate, said coating composition being in a first state,
b) forming an assembly comprising the substrate carrying the coating layer and the one or more negative indicia or one or more positive indicia, wherein the substrate carrying the coating layer is arranged above the one or more negative indicia or one or more positive indicia, wherein the one or more negative indicia consist of a soft magnetic plate comprising one or more voids having the shape of the one or more indicia, the soft magnetic plate being either made of the one or more metals, alloys or compounds of high magnetic permeability or being made of the composite comprising from about 25 wt-% to about 95 wt-% of soft magnetic particles dispersed in a non-magnetic material, the weight percents being based on the total weight of the composite, and the one or more positive indicia consist of an arrangement comprising one or more indicia placed or attached to a non-magnetic holder, said indicia being either made of the one or more metals, alloys or compounds of high magnetic permeability or being made of the composite comprising from about 25 wt-% to about 95 wt-% of soft magnetic particles dispersed in a non-magnetic material, the weight percents being based on the total weight of the composite, c) moving the assembly comprising the substrate carrying the coating layer and the one or more negative indicia or one or more positive indicia obtained under step b) through an inhomogeneous magnetic field of a static magnetic-field-generating device so as to bi-axially orient at least a part of the platelet-shaped magnetic or magnetizable pigment particles, and d) hardening the coating composition to a second state so as to fix the platelet-shaped magnetic or magnetizable pigment particles in their adopted positions and orientations By specifying that "the substrate carrying the coating layer is arranged above the one or more negative indicia or one or more positive indicia", a preferable case is encompassed where the one or more negative indicia or one or more positive indicia and the substrate are arranged so that the substrate carrying the coating layer is arranged vertically directly above the one or more negative indicia or one or more positive indicia, that is, the direction of their arrangement relative to each other is in essence vertical.

The process described herein comprises a step a) of applying onto the substrate surface described herein the coating composition comprising platelet-shaped magnetic or magnetizable pigment particles described herein so as to form a coating layer, said coating composition being in a first physical state which allows its application as a layer and which is in a not yet hardened (i.e. wet) state wherein the platelet-shaped magnetic or magnetizable pigment particles can move and rotate within the binder material. Since the coating composition described herein is to be provided on a substrate surface, it is necessary that the coating composition comprising at least the binder material described herein and the platelet-shaped magnetic or magnetizable pigment particles is in a form that allows its processing on the desired printing or coating equipment. Preferably, said step a) is carried out by a printing process, preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Screen printing (also referred in the art as silkscreen printing) is a stencil process wherein an ink is transferred to a surface through a stencil supported by a fine fabric mesh of silk, mono- or multi-filaments made of synthetic fibers such as for example polyamides or polyesters or metal threads stretched tightly on a frame made for example of wood or a metal (e.g. aluminum or stainless steel). Alternatively, the screen-printing mesh may be a chemically etched, a laser-etched, or a galvanically formed porous metal foil, e.g. a stainless steel foil. The pores of the mesh are blocked in the non-image areas and left open in the image area, the image carrier being called the screen. Screen printing might be of the flat-bed or rotary type. Screen printing is further described for example in The Printing ink manual, R. H. Leach and R. J. Pierce, Springer Edition, $5^{th}$ Edition, pages 58-62 and in Printing Technology, J. M. Adams and P. A. Dolin, Delmar Thomson Learning, $5^{th}$ Edition, pages 293-328.

Rotogravure (also referred in the art as gravure) is a printing process wherein the image elements are engraved into the surface of a cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink. More details are provided in "Handbook of print media", Helmut Kipphan, Springer Edition, page 48 and in The Printing ink manual, R. H. Leach and R. J. Pierce, Springer Edition, $5^{th}$ Edition, pages 42-51.

Flexography preferably uses a unit with a doctor blade, preferably a chambered doctor blade, an anilox roller and plate cylinder. The anilox roller advantageously has small cells whose volume and/or density determines the ink application rate. The doctor blade lies against the anilox roller, and scraps off surplus ink at the same time. The anilox roller transfers the ink to the plate cylinder which finally transfers the ink to the substrate. Specific design might be achieved using a designed photopolymer plate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the nonimage areas, which lowers the plate surface in these nonimage areas. After processing, the plate is dried and given a post-exposure dose of UV light to cure the whole plate. Preparation of plate cylinders for flexography is described in Printing Technology, J. M. Adams and P. A. Dolin, Delmar Thomson Learning, $5^{th}$ Edition, pages 359-360 and in The Printing ink manual, R. H. Leach and R. J. Pierce, Springer Edition, $5^{th}$ Edition, pages 33-42.

The coating composition described herein as well as the coating layer described herein comprise platelet-shaped magnetic or magnetizable pigment particles. Preferably, the platelet-shaped magnetic or magnetizable pigment particles described herein are present in an amount from about 5 wt-% to about 40 wt-%, more preferably about 10 wt-% to about 30 wt-%, the weight percentages being based on the total weight of the coating composition.

In contrast to needle-shaped pigment particles which can be considered as quasi one-dimensional particles, platelet-shaped pigment particles are quasi two-dimensional particles due to the large aspect ratio of their dimensions. Platelet-shaped pigment particle can be considered as a two-dimensional structure wherein the dimensions X and Y are substantially larger than the dimension Z. Platelet-shaped pigment particles are also referred in the art as oblate particles or flakes. Such pigment particles may be described with a main axis X corresponding to their longest dimension crossing the pigment particle and a second axis Y perpendicular to X and corresponding to the second longest dimension crossing the pigment particle. In other words, the XY plane roughly defines the plane formed by the first and second longest dimensions of the pigment particle, the Z dimension being ignored.

The platelet-shaped magnetic or magnetizable pigment particles described herein have, due to their non-spherical shape, non-isotropic reflectivity with respect to incident electromagnetic radiation for which the hardened/cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction.

The OEL described herein comprises platelet-shaped magnetic or magnetizable pigment particles that, due to their shape, have non-isotropic reflectivity. In the OELs described herein, the platelet-shaped magnetic or magnetizable pigment particles described herein are dispersed in the coating composition comprising a hardened binder material that fixes the orientation of the platelet-shaped magnetic or magnetizable pigment particles. The binder material is at least in its hardened or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the particles contained in the binder material in its hardened or solid state and their orientation-dependent reflectivity can be perceived through the binder material at some wavelengths within this range. Preferably, the hardened binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the hardened binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the hardened binder material (not including the platelet-shaped magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. In this case, it is preferable that the OEL comprises luminescent pigment particles that show luminescence in response to the selected wavelength outside the visible spectrum contained in the incident radiation. The infrared, visible and UV portions of the electromagnetic spectrum approximately correspond to the wavelength ranges between 700-2500 nm, 400-700 nm, and 200-400 nm respectively.

Suitable examples of platelet-shaped magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of platelet-shaped magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicium oxide (SiO), silicium dioxide ($SiO_2$), titanium oxide ($TiO_2$), and aluminum oxide ($Al_2O_3$), more preferably silicium dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation NM multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

The coating composition described herein may comprise platelet-shaped optically variable magnetic or magnetizable pigment particles, and/or platelet-shaped magnetic or magnetizable pigment particles having no optically variable properties. Preferably, at least a part of the platelet-shaped magnetic or magnetizable pigment particles described herein is constituted by platelet-shaped optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed.

The use of platelet-shaped optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the platelet-shaped magnetic or magnetizable pigment particles is constituted by platelet-shaped optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicium oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicium dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 whose content is hereby incorporated by reference in its entirety.

Magnetic thin film interference pigment particles described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 whose contents are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence NB and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures of two or more thereof. Furthermore, one or more additional layers such as coloring layers may be present.

The magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

Further, subsequently to the application of the coating composition described herein on the substrate surface described herein so as to form a coating layer (step a)), an assembly comprising the substrate carrying the coating layer and the one or more negative or one or more positive indicia described herein is formed, wherein the substrate carrying the coating layer is arranged above the one or more negative or one or more positive indicia, preferably wherein the coating layer represents the topmost layer of the assembly and is preferably exposed to the environment.

Subsequently to the formation of the assembly comprising the substrate carrying the coating composition and the one or more negative or one or more positive indicia, the platelet-shaped magnetic or magnetizable pigment particles are oriented (step c)) by moving said assembly through the inhomogeneous magnetic field of the static magnetic-field-generating device described herein so as to bi-axially orient at least a part of the platelet-shaped magnetic or magnetizable pigment particles.

Subsequently to or partially simultaneously, preferably partially simultaneously, with the steps of orienting the platelet-shaped magnetic or magnetizable pigment particles by moving the assembly through the inhomogeneous magnetic field of the static magnetic-field-generating device described herein (step c)), the orientation of the platelet-shaped magnetic or magnetizable pigment particles is fixed or frozen (step d)). The coating composition must thus noteworthy have a first state, i.e. a liquid or pasty state, wherein the coating composition is not yet hardened and wet or soft enough, so that the platelet-shaped magnetic or magnetizable pigment particles dispersed in the coating composition are freely movable, rotatable and orientable upon exposure to a magnetic field, and a second hardened (e.g. solid or solid-like) state, wherein the platelet-shaped magnetic or magnetizable pigment particles are fixed or frozen in their respective positions and orientations.

Such a first and second state is preferably provided by using a certain type of coating composition. For example, the components of the coating composition other than the platelet-shaped magnetic or magnetizable pigment particles may take the form of an ink or coating composition such as those which are used in security applications, e.g. for banknote printing. The aforementioned first and second states can be provided by using a material that shows an increase in viscosity in reaction to a stimulus such as for example a temperature change or an exposure to an electromagnetic radiation. That is, when the fluid binder material is hardened or solidified, said binder material converts into the second state, i.e. a hardened or solid state, where the platelet-shaped magnetic or magnetizable pigment particles are fixed in their current positions and orientations and can no longer move nor rotate within the binder material. As known to those skilled in the art, ingredients comprised in an ink or coating composition to be applied onto a surface such as a substrate and the physical properties of said ink or coating composition must fulfill the requirements of the process used to transfer the ink or coating composition to the substrate surface. Consequently, the binder material comprised in the coating composition described herein is typically chosen among those known in the art and depends on the coating or printing process used to apply the ink or coating composition and the chosen hardening process.

The hardening step described herein (step d)) can be of purely physical nature, e.g. in cases where the coating composition comprises a polymeric binder material and a solvent and is applied at high temperatures. Then, the platelet-shaped magnetic or magnetizable pigment particles are oriented at high temperature by the application of a magnetic field, and the solvent is evaporated, followed by cooling of the coating composition. Thereby the coating composition is hardened and the orientation of the pigment particles is fixed.

Alternatively and preferably, the hardening of the coating composition involves a chemical reaction, for instance by curing, which is not reversed by a simple temperature increase (e.g. up to 80° C.) that may occur during a typical use of a security document. The term "curing" or "curable" refers to processes including the chemical reaction, cross-linking or polymerization of at least one component in the applied coating composition in such a manner that it turns into a polymeric material having a greater molecular weight than the starting substances. Preferably, the curing causes the formation of a stable three-dimensional polymeric network. Such a curing is generally induced by applying an external stimulus to the coating composition (i) after its application on a substrate (step a)) and (ii) subsequently to, or partially simultaneously with the bi-axial orientation of at least part of the platelet-shaped magnetic or magnetizable pigment particles (step c)). Advantageously the hardening (step d)) of the coating composition described herein is carried out partially simultaneously with the orientation of at least a part of the platelet-shaped magnetic or magnetizable pigment particles (step c)). Therefore, preferably the coating composition is selected from the group consisting of radiation curable compositions, thermally drying compositions, oxidatively drying compositions, and combinations thereof. Particularly preferred are coating compositions selected from the group consisting of radiation curable compositions. Radiation curing, in particular UV-Vis curing, advantageously leads to an instantaneous increase in viscosity of the coating composition after exposure to the irradiation, thus preventing any further movement of the pigment particles and in consequence any loss of information after the magnetic orientation step. Preferably, the hardening step (step d)) is carried out by irradiation with UV-visible light (i.e. UV-Vis light radiation curing) or by E-beam (i.e. E-beam radiation curing), more preferably by irradiation with UV-Vis light.

Therefore, suitable coating compositions for the present invention include radiation curable compositions that may be cured by UV-visible light radiation (hereafter referred as UV-Vis-curable) or by E-beam radiation (hereafter referred as EB). According to one particularly preferred embodiment of the present invention, the coating composition described herein is a UV-Vis-curable coating composition. UV-Vis curing advantageously allows very fast curing processes and hence drastically decreases the preparation time of the OEL described herein, documents and articles and documents comprising said OEL.

Preferably, the UV-Vis-curable coating composition comprises one or more compounds selected from the group consisting of radically curable compounds and cationically curable compounds. The UV-Vis-curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis-curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

Alternatively, a polymeric thermoplastic binder material or a thermoset may be employed. Unlike thermosets, thermoplastic resins can be repeatedly melted and solidified by heating and cooling without incurring any important changes in properties. Typical examples of thermoplastic resin or polymer include without limitation polyamides, polyesters, polyacetals, polyolefins, styrenic polymers, polycarbonates, polyarylates, polyimides, polyether ether ketones (PEEK), polyetherketeoneketones (PEKK), polyphenylene based resins (e.g. polyphenylenethers, polyphenylene oxides, polyphenylene sulfides), polysulphones and mixtures of two or more thereof.

The coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The coating composition described herein may further comprise one or more additives including without limitation compounds and materials which are used for adjusting physical, rheological and chemical parameters of the composition such as the viscosity (e.g. solvents and surfactants), the consistency (e.g. anti-settling agents, fillers and plasticizers), the foaming properties (e.g. antifoaming agents), the lubricating properties (waxes), UV reactivity and stability (photosensitizers and photostabilizers) and adhesion properties, etc. Additives described herein may be present in the coating compositions described herein in amounts and in forms known in the art, including in the form of so-called nano-materials where at least one of the dimensions of the particles is in the range of 1 to 1000 nm.

The coating composition described herein may further comprise one or more marker substances or taggants and/or one or more machine readable materials selected from the group consisting of magnetic materials (different from the magnetic or magnetizable pigment particles described herein), luminescent materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The coating compositions described herein may be prepared by dispersing or mixing the magnetic or magnetizable pigment particles described herein and the one or more additives when present in the presence of the binder material described herein, thus forming liquid compositions. When present, the one or more photoinitiators may be added to the composition either during the dispersing or mixing step of all other ingredients or may be added at a later stage, i.e. after the formation of the liquid coating composition.

Figures 1, 1A, 2:
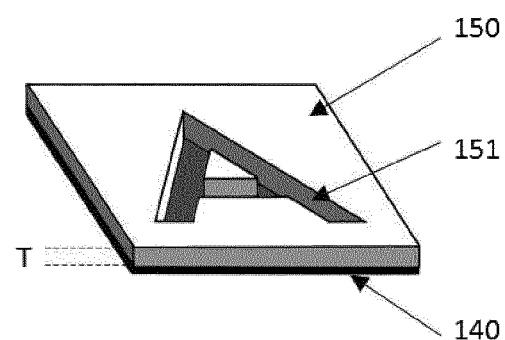

According to one embodiment, the assembly described herein comprises the substrate carrying the coating layer and one or more negative indicia. As shown in FIG. 1A-1, the one or more negative indicia consist of a soft magnetic plate (150) having a thickness (T) and comprising one or more voids (151) having the shape of the one or more indicia. Alternatively and as shown in FIG. 1A-2, the one or more negative indicia may consist of i) a soft magnetic plate (150) having a thickness (T) and comprising one or more voids (151) having the shape of the one or more indicia and ii) a non-magnetic holder (140). The expression "negative indicia" refers to material-free areas in an otherwise continuous soft magnetic plate. The expression "voids" means in the context of the present invention, a hole or channel which goes through the soft magnetic plate and connects both sides thereof. The voids described herein may be produced by taking off material from the surface of the soft magnetic plate or by adding material to the surface of a non-magnetic holder, when a non-magnetic holder is used. The one or more negative indicia may be attached to the non-magnetic holder described herein by gluing the soft magnetic plate of said one or more negative indicia to the non-magnetic holder or mechanical means may be used.

The soft magnetic plate comprising the one or more voids having the shape of the one or more indicia described herein is either made of the one or more metals, alloys or compounds of high magnetic permeability described herein (referred as "soft magnetic metal plate") or is made of the composite comprising soft magnetic particles dispersed in a non-magnetic material described herein (hereafter referred as "soft magnetic composite plate").
the one or more voids having the shape of the one or more indicia described herein is either made of the one or more metals, alloys or compounds of high magnetic permeability described herein (referred as "soft magnetic metal plate") or is made of the composite comprising soft magnetic particles dispersed in a non-magnetic material described herein (hereafter referred as "soft magnetic composite plate").

According to one embodiment, the soft magnetic metal plate described herein is made of one or more metals, alloys or compounds of high magnetic permeability, i.e. materials having a low coercivity and a high permeability $\mu$. Suitable soft magnetic materials have a maximum relative permeability $\mu_{R\ max}$ of at least 5, where the relative permeability $\mu_R$ is the permeability of the material $\mu$ relative to the permeability of the free space $\mu_0$ ($\mu_R=\mu/\mu_0$) (Magnetic Materials, Fundamentals and Applications, $2^{nd}$ Ed., Nicola A. Spaldin, p. 16-17, Cambridge University Press, 2011). Soft magnetic materials have a low coercivity and a high saturation magnetization. Suitable low-coercivity, high-saturation materials have a coercivity lower than 1000 $Am^{-1}$ as measured according to IEC 60404-1:2000, to allow for a fast magnetization and demagnetization, and their saturation magnetization is preferably at least 1 Tesla, more preferably at least 1.5 Tesla, and even more preferably at least 2 Tesla. Soft magnetic materials are described, for example, in the following handbooks: (1) Handbook of Condensed Matter and Materials Data, Chap. 4.3.2, Soft Magnetic Materials, p. 758-793, and Chap. 4.3.4, Magnetic Oxides, p. 811-813, Springer 2005; (2) Ferromagnetic Materials, Vol. 1, Iron, Cobalt and Nickel, p. 1-70, Elsevier 1999; (3) Ferromagnetic Materials, Vol. 2, Chap. 2, Soft Magnetic Metallic Materials, p. 55-188, and Chap. 3, Ferrites for non-microwave Applications, p. 189-241, Elsevier 1999; (4) Electric and Magnetic Properties of Metals, C. Moosbrugger, Chap. 8, Magnetically Soft Materials, p. 196-209, ASM International, 2000; (5) Handbook of modern Ferromagnetic Materials, Chap. 9, High-permeability High-frequency Metal Strip, p. 155-182, Kluwer Academic Publishers, 2002; and (6) Smithells Metals Reference Book, Chap. 20.3, Magnetically Soft Materials, p. 20-9-20-16, Butterworth-Heinemann Ltd, 1992.

According to one embodiment, the soft magnetic metal plate described herein is made of one or more soft magnetic metals or alloys easily workable as sheets or threads. Preferably, the soft magnetic metal plate described herein is made from one or more materials selected from the group consisting of iron, cobalt, nickel, nickel-molybdenum alloys, nickel-iron alloys (permalloy or supermalloy-type materials), cobalt-iron alloys, cobalt-nickels alloys iron-nickel-cobalt alloys (Fernico-type materials), Heusler-type alloys (such as $Cu_2MnSn$ or $Ni_2MnAl$), low silicon steels, low carbon steels, silicon irons (electrical steels), iron-aluminum alloys, iron-aluminum-silicon alloys, amorphous metal alloys (e.g. alloys like Metglas®, iron-boron alloys), nanocrystalline soft magnetic materials (e.g. Vitroperm®) and combinations thereof, more preferably selected from the group consisting of iron, cobalt, nickel, low carbon steels, silicon iron, nickel-iron alloys and cobalt-iron alloys and combinations thereof.

The soft magnetic metal plate described herein has preferably a thickness between about 10 μm and about 1000 μm, more preferably between about 50 μm and about 500 μm, still more preferably between about 50 μm and about 250 μm, and even more preferably between about 50 μm and about 150 μm.

The one or more voids having the shape of the one or more indicia of the soft magnetic metal plates may be produced by any cutting or engraving methods known in the art including without limitation casting, molding, hand-engraving or ablation tools selected from the group consisting of mechanical ablation tools, gaseous or liquid jet ablation tools, by chemical etching, electro-chemical etching and laser ablation tools (e.g. $CO^{2-}$, Nd-YAG or excimer lasers).

According to another embodiment, the soft magnetic composite plate described herein is made of a composite comprising from about 25 wt-% to about 95 wt-% of soft magnetic particles dispersed in a non-magnetic material, the weight percents being based on the total weight of the composite. Preferably, the composite of the soft magnetic composite plate comprises from about 50 wt-% to about 90 wt-%, of soft magnetic particles, the weight percents being based on the total weight of the composite. The soft magnetic particles described herein are made of one or more soft magnetic materials preferably selected from the group consisting of iron (especially iron pentacarbonyl, also called carbonyl iron), nickel (especially nickel tetracarbonyl, also called carbonyl nickel), cobalt, soft magnetic ferrites (e.g. manganese-zinc ferrites and nickel-zinc ferrites), soft magnetic oxides (e.g. oxides of manganese, iron, cobalt and nickel) and combinations thereof, more preferably selected from the group consisting of carbonyl iron, carbonyl nickel, cobalt and combinations thereof.

The soft magnetic particles may have a needle-like shape, a platelet-like shape or a spherical shape. Preferably, the soft magnetic particles have a spherical shape so as to maximize the saturation of the soft magnetic composite plate and have the highest possible concentration without losing the cohesion of the soft magnetic composite plate. Preferably, the soft magnetic particles have a spherical shape and have an average particle size ($d_{50}$) between about 0.1 μm and about 1000 μm, more preferably between about 0.5 μm and about 100 μm, still more preferably between about 1 μm and 20 about μm, and even more preferably between 2 about μm and 10 about μm, $d_{50}$ being measured by laser diffraction using for example a microtrac X100 laser particle size analyzer.

The soft magnetic composite plate described herein is made of a composite, wherein said composite comprises the soft magnetic particles described herein dispersed in a non-magnetic material. Suitable non-magnetic materials include without limitation polymeric materials forming a matrix for the dispersed soft magnetic particles. The polymeric matrix-forming materials may be one or more thermoplastic materials or one or more thermosetting materials or comprise one or more thermoplastic materials or one or more thermosetting materials. Suitable thermoplastic materials include without limitation polyamides, co-polyamides, polyacetals (also called polyoxymethylene, POM), polyphtalimides, polyolefins, polyesters, polytetrafluoroethylenes, polyacrylates, polymethacrylates (e.g. PMMA), polyimides, polyetherimides, polyetheretherketones, polyaryletherketones, polyphenylene sulfides, liquid crystal polymers, polycarbonates and mixtures thereof. Suitable thermosetting materials include without limitation epoxy resins, phenolic resins, polyimide resins, polyester resins, silicon resins and mixtures thereof. The soft magnetic composite plate described herein is made of a composite comprising from about 5 wt-% to about 75 wt-% of the non-magnetic material described herein, the weight percents being based on the total weight of the composite.

The composite described herein may further comprise one or more additives such as for example hardeners, dispersants, plasticizers, fillers/extenders and defoamers.

The soft magnetic composite plate described herein has preferably a thickness of at least about 0.5 mm, more preferably at least about 1 mm and still more preferably between about 1 mm and about 5 mm.

The one or more voids having the shape of the one or more indicia of the soft magnetic composite plates may be produced by any cutting or engraving methods known in the art including without limitation casting, molding, hand-engraving or ablation tools selected from the group consisting of mechanical ablation tools, gaseous or liquid jet ablation tools, by chemical etching, electro-chemical etching and laser ablation tools (e.g. $CO^{2-}$, Nd-YAG or excimer lasers). The present invention advantageously uses the soft magnetic composite plates described herein since said plates may be easily produced and treated like any other polymer material. Techniques well-known in the art including 3D printing, lamination molding, compression molding, resin transfer molding or injection molding may be used. After molding, standard curing procedures may be applied, such as cooling down (when thermoplastic polymers are used) or curing at high or low temperature (when thermosetting polymers are used). Another way to obtain the soft magnetic composite plates described herein is to remove parts of them to get the required void(s) using standard tools to work out plastic parts. Especially, mechanical ablation tools may be advantageously used.

The soft magnetic plate described herein may additionally be surface-treated for facilitating the contact with the assembly comprising the substrate carrying the coating composition described herein, reducing friction and/or wear and/or electrostatic charging in a high-speed printing applications.

According to one embodiment, the soft magnetic plate described herein comprises one or more voids having the shape of the one or more indicia, wherein said one or more voids may be filled up with a non-magnetic material including a polymeric binder such as those described hereabove and optionally fillers.

Figure 2A:
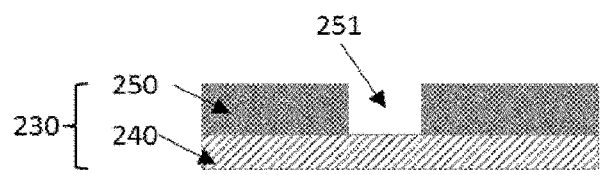
FIG. 2A schematically illustrate a cross-section of an arrangement (230) comprising i) a negative indicium consisting of a soft magnetic plate (250) comprising a void (251) having the shape of the indicium and ii) a non-magnetic holder (240), wherein the soft magnetic plate (250) comprising the void (251) is placed above the non-magnetic holder (240).
Figure 2B:
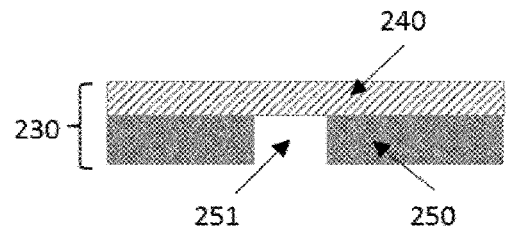
FIG. 2B schematically illustrate a cross-section of an arrangement (230) comprising i) a negative indicium consisting of a soft magnetic plate (250) having comprising a void (251) having the shape of the indicium and ii) a non-magnetic holder (240), wherein the soft magnetic plate (250) comprising the void (251) is placed below the non-magnetic holder (240).
Figure 2C:
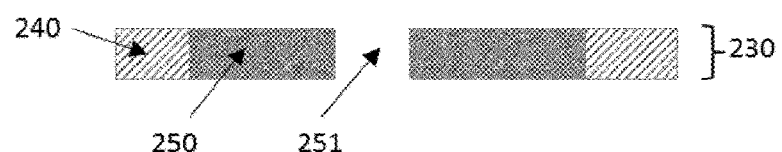
FIG. 2C schematically illustrate a cross-section of an arrangement (230) comprising i) a negative indicium consisting of a soft magnetic plate (250) comprising a void (251) having the shape of the indicium and ii) a non-magnetic holder (240), wherein the plate (250) comprising the void (251) is embedded in the non-magnetic holder (240).

As described herein and shown in FIG. 1A-2, the one or more negative indicia may consist of i) a soft magnetic plate (150) comprising one or more voids (151) having the shape of the one or more indicia and ii) the non-magnetic holder (140). As shown in FIG. 2A, the soft magnetic plate (250) comprising one or more voids (251) having the shape of the one or more indicia may be placed above the non-magnetic holder (240). Alternatively, and as shown in FIG. 2B, the soft magnetic plate (250) comprising one or more voids (251) having the shape of the one or more indicia may be placed below the non-magnetic holder (240). Alternatively, and as shown in FIG. 2C, the soft magnetic plate (250) comprising one or more voids (251) having the shape of the one or more indicia may be embedded in the non-magnetic holder (240). Preferably and as shown in FIG. 2A, the soft magnetic plate (250) comprising one or more voids (251) having the shape of the one or more indicia may be placed above the non-magnetic holder (240). The thickness of the non-magnetic holder is not limited. Typically, the non-magnetic holder has a thickness between about 1 mm and about 20 mm.

Figure 1B:
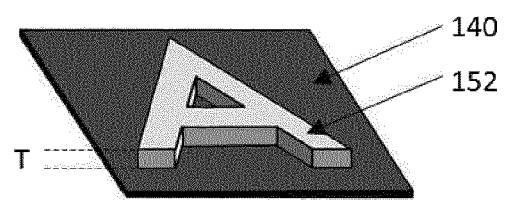
FIG. 1B schematically illustrates a positive indicium consisting of an arrangement comprising an indicium (152) having a thickness (T) and being placed on a non-magnetic holder (140).

According to another embodiment, the assembly described herein comprises the substrate carrying the coating layer and one or more positive indicia. As shown in FIG. 1B, the one or more positive indicia consist of i) one or more indicia (152) having a thickness (T) and being placed or attached to ii) a non-magnetic holder (140) (the one or more indicia (152) being placed above the non-magnetic holder (140) in FIG. 1B).

The one or more indicia of the one or more positive indicia are either made of the one or more metals, alloys or compounds of high magnetic permeability described hereabove or are made of the composite described hereabove. The one or more indicia described herein may be produced by adding the one or more metals, alloys or compounds of high magnetic permeability or the composite to a surface or by taking off material from the surface of a plate made of the one or more metals, alloys or compounds of high magnetic permeability or made of the composite. In particular, the one or more indicia of the one or more positive indicia may be produced by any cutting or engraving methods known in the art including without limitation hand-engraving or ablation tools selected from the group consisting of mechanical ablation tools, gaseous or liquid jet ablation tools, by chemical etching, electro-chemical etching and laser ablation tools (e.g. $CO^{2-}$, Nd-YAG or excimer lasers). Alternatively, and as described for the soft magnetic composite plate, the one or more indicia of the one or more positive indicia may be produced by 3D printing, casting, lamination molding, compression molding, resin transfer molding or injection molding.

When the one or more indicia of the one or more positive indicia described herein are made of the one or more metals, alloys or compounds of high magnetic permeability described herein, they preferably have a thickness between about 10 μm and about 1000 μm, more preferably between about 50 μm and about 500 μm, still more preferably between about 50 μm and about 250 μm, and even more preferably between about 50 μm and about 150 μm.

When the one or more indicia of the one or more positive indicia described herein are made of the composite described herein, they preferably have a thickness of at least about 0.5 mm, more preferably at least about 1 mm and still more preferably between about 1 mm and about 5 mm.

Figure 3A:
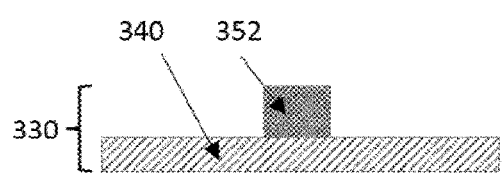
FIG. 3A schematically illustrate a cross-section of a positive indicium consisting of an arrangement (330) comprising an indicium (352) and a non-magnetic holder (340), wherein the indicium (352) is placed above the non-magnetic holder (340).
Figure 3B:
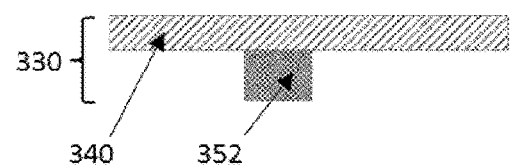
FIG. 3B schematically illustrate a cross-section of a positive indicium consisting of an arrangement (330) comprising an indicium (352) and a non-magnetic holder (340), wherein the indicium (352) is placed below the non-magnetic holder (340).
Figure 3C:
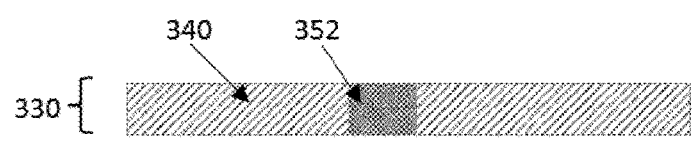
FIG. 3C schematically illustrate a cross-section of a positive indicium consisting of an arrangement (330) comprising an indicium (352) and a non-magnetic holder (340), wherein the indicium (352) is embedded in the non-magnetic holder (340).

As described herein and shown in FIG. 1B, the one or more positive indicia may consist of i) one or more indicia (152) and ii) a non-magnetic holder (140). As shown in FIG. 3A, the one or more positive indicia consist of one or more indicia (352) and a non-magnetic holder (340), wherein the one or indicia (352) may be attached or placed above the non-magnetic holder (340) so that the one or indicia (352) face the substrate (not shown in FIG. 3A). Alternatively, and as shown in FIG. 3B, the one or more positive indicia consist of one or more indicia (352) and a non-magnetic holder (340), wherein the one or indicia (352) may be attached or placed below the non-magnetic holder (340). Alternatively, and as shown in FIG. 2C. The one or more indicia of the one or more indicia of the one or more positive indicia may be attached to the non-magnetic holder described herein by gluing the one or more indicia of the one or more positive indicia to the non-magnetic holder or mechanical means may be used.

the one or more positive indicia consist of one or more indicia (352) and a non-magnetic holder (340), wherein the one or indicia (352) may be embedded in the non-magnetic holder (340). Preferably, the one or more positive indicia consist of one or more indicia and a non-magnetic holder, wherein the one or more indicia are attached or placed above the non-magnetic holder (see FIG. 3A) so that the one or more indicia face the substrate. The thickness of the non-magnetic holder is not limited. Typically, the non-magnetic holder has a thickness between about 1 mm and about 20 mm.

The non-magnetic holder of the one or more positive indicia and the optional non-magnetic holder of the one or more indicia are made of one or more non-magnetic materials. Suitable materials for the non-magnetic holder of the one or more positive indicia and the optional non-magnetic holder of the one or more negative indicia described herein include without limitation the polymeric matrix materials described herein for the composite. The non-magnetic materials are preferably selected from the group consisting of low conducting materials, non-conducting materials and mixtures thereof, such as for example engineering plastics and polymers, aluminum, aluminum alloys, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), polyamides and PPS.

The non-magnetic holder described herein, the soft magnetic metal plate and the soft magnetic composite plate described herein, as the case may be, may be flat or planar. According to another embodiment, the non-magnetic supporting plate described herein, the soft magnetic metal plate and the soft magnetic composite plate described herein, as the case may be, may be curved so as to be adaptable in or on a rotating cylinder of printing assemblies. The rotating cylinder is meant to be used in, or in conjunction with, or being part of a printing or coating equipment, and bearing one or more negative indicia or one or more positive indicia described herein. In an embodiment, the rotating cylinder is part of a rotary, sheet-fed or web-fed industrial printing press that operates at high printing speed in a continuous way.

The process described herein comprises a step of moving through an inhomogeneous magnetic field of a static magnetic-field-generating device an assembly comprising the substrate carrying the coating layer and the one or more negative indicia or one or more positive indicia described herein, wherein the substrate carrying the coating layer is arranged above the one or more negative indicia or one or more positive indicia, and wherein the coating layer preferably represents the topmost layer of the assembly and is exposed to the environment.

The distance between the top surface of the one or more negative indicia or one or more positive indicia and the substrate carrying the coating layer is adjusted and selected to obtain the desired bright and highly resolved optical effect layers exhibiting a 3D striking appearance. It is particularly preferred to use a distance between the top surface of the one or more negative indicia or one or more positive indicia and the substrate close to zero or being zero.

According to one embodiment, the assembly comprises the substrate carrying the coating layer and the one or more negative indicia or one or more positive indicia described herein, wherein the substrate carrying the coating layer is arranged above the one or more negative indicia or one or more positive indicia, and wherein the coating layer preferably represents the topmost layer of the assembly and is preferably exposed to the environment.

The assembly comprising the substrate carrying the coating composition and the one or more negative indicia or one or more positive indicia described herein is moved through the inhomogeneous magnetic field of the static magnetic-field-generating device as described herein so that the platelet-shaped magnetic or magnetizable pigment particles are exposed to a magnetic field which is at least time-varying in direction thus bi-axially orienting at least part of said platelet-shaped magnetic or magnetizable pigment particles while the coating composition is still in a wet (i.e. not yet hardened) state. The movement of said assembly within the magnetic field of the static magnetic-field-generating device must allow the magnetic field vector, as described in the reference frame of the substrate, to vary essentially within a single plane at individual locations on the substrate. This can be achieved by rotational oscillations, by complete (360° or more) rotation of the assembly, preferably by a back and forth translational movement along a path, more preferably by a translational movement in a single direction along a path. Particularly preferable are single translational movements that follow a linear or cylindrical path. The soft magnetic plate of the one or more negative indicia and the positive indicia described herein acts as a magnetic field guide, very close to the coating composition, when placed into the magnetic field of the external static magnetic-field generating device, hence deviating the magnetic field from its original direction. At the place of the one or more voids of the one or more negative indicia or at the place of the one or more positive indicia, the direction and intensity of the magnetic field lines are locally modified so as to cause the orientation of the platelet-shaped magnetic or magnetizable pigment particles to locally change compared to the orientation of the pigment particles that are further away from said one or more voids of the one or more negative indicia or said one or more positive indicia. This in turn generates the desired eye-catching relief and 3D effect.

Contrary to a mono-axial orientation wherein the platelet-shaped magnetic or magnetizable pigment particles are orientated in such a way that only one of their main axis (the longer one) is constrained by the magnetic field vector, carrying out a bi-axial orientation means that the platelet-shaped magnetic or magnetizable pigment particles are made to orient in such a way that both their two main axes are constrained. Such biaxial orientation is achieved, according to the invention, by exposing and moving the assembly comprising the substrate carrying the coating layer and the one or more negative indicia or one or more positive indicia to and through the inhomogeneous magnetic field of the static magnetic-field generating device. Accordingly, said static magnetic-field generating device must be configured in such a way that, along the path of motion followed by individual platelet-shaped magnetic or magnetizable pigment particles of the coating layer, the magnetic field lines change at least in direction within a plane which is fixed in the reference frame of the moving assembly. Bi-axial orientation aligns the planes of the platelet-shaped magnetic or magnetizable pigment particles so that said planes are oriented to be locally substantially parallel to each other.

According to one embodiment, the step of carrying out a bi-axial orientation of the platelet-shaped magnetic or magnetizable pigment particles leads to a magnetic orientation wherein the platelet-shaped magnetic or magnetizable pigment particles have their two main axes substantially parallel to the substrate surface except in the regions carrying the one or more voids of the one or more negative indicia or in the regions carrying the one or more positive indicia. For such an alignment, the platelet-shaped magnetic or magnetizable pigment particles are planarized within the coating layer on the substrate and are oriented with both their axis parallel with the substrate surface, except in the regions carrying the one or more voids of the one or more negative indicia or in the regions carrying the one or more positive indicia where a wider range of angles is covered. This is achieved when, seen along the path of motion, the magnetic-field of the magnetic field generating device remains parallel to a plane that is tangential to the surface of the assembly comprising the coating layer, the substrate and the one or more negative indicia or one or more positive indicia.

According to another embodiment, the step of carrying a bi-axial orientation of at least a part of the platelet-shaped magnetic or magnetizable pigment particles leads to a magnetic orientation wherein the platelet-shaped magnetic or magnetizable pigment particles have a first main axis substantially parallel to the substrate surface and a second main axis being perpendicular to said first axis at a substantially non-zero elevation angle to the substrate surface except in the regions carrying the one or more negative indicia or in the regions carrying the one or more positive indicia where a wider range of angles is covered. Alternatively, the platelet-shaped magnetic or magnetizable pigment particles have their two main axes X and Y at a substantially non-zero elevation angle to the substrate surface except in the regions carrying the one or more voids of the one or more negative indicia or in the regions carrying the one or more positive indicia where a wider range of angles is covered. This is achieved when, seen along the path of motion, the angle between the magnetic-field lines of the magnetic-field-generating device vary within a plane that forms a non-zero angle with respect to a plane tangential to the surface of the assembly comprising the coating layer, the substrate and the one or more negative indicia or one or more positive indicia.

Bi-axial orientation of the platelet-shaped magnetic or magnetizable pigment particles may be carried out by moving the assembly comprising the substrate carrying the coating layer and the one or more negative indicia or one or more positive indicia at an appropriate speed through a magnetic-field-generating device such as those described in EP 2 157 141 A1. Such devices provide a magnetic field that changes its direction while the platelet-shaped magnetic or magnetizable pigment particles move through said devices, forcing the platelet-shaped magnetic or magnetizable pigment particles to rapidly oscillate until both main axes, X-axis and Y-axis, become parallel to the substrate surface, i.e. the platelet-shaped magnetic or magnetizable pigment particles oscillate until they come to the stable sheet-like formation with their X and Y axes parallel to the substrate surface and are planarized in said two dimensions. As shown in FIG. 5 of EP 2 157 141, the magnetic-field-generating device described herein comprises a linear arrangement of at least three magnets that are positioned in a staggered fashion or in zigzag formation, said at least three magnets being on opposite sides of a feedpath where magnets at the same side of the feedpath have the same polarity, which is opposed to the polarity of the magnet(s) on the opposing side of the feedpath in a staggered fashion. The arrangement of the at least three magnets provides a predetermined change of the field direction as platelet-shaped magnetic or magnetizable pigment particles in a coating composition move past the magnets (direction of movement: arrow). According to one embodiment, the magnetic-field-generating device comprises a) a first magnet and a third magnet on a first side of a feedpath and b) a second magnet between the first and third magnets on a second opposite side of the feedpath, wherein the first and third magnets have a same polarity and wherein the second magnet has a complementary polarity to the first and third magnets. According to another embodiment, the magnetic-field-generating device further comprises a fourth magnets on the same side of the feedpath as the second magnet, having the polarity of the second magnet and complementary to the polarity of the third magnet. As described in EP 2 157 141 A1, the magnetic-field-generating device can be either underneath the layer comprising the platelet-shaped magnetic or magnetizable pigment particles, or above and underneath.

Carrying out a bi-axial orientation of the platelet-shaped magnetic or magnetizable pigment particles may be carried out by moving the assembly comprising the substrate carrying the coating layer and the one or more negative indicia or one or more positive indicia at an appropriate speed along a linear permanent magnet Halbach array or through an arrangement of two or more Halbach arrays disposed in an appropriate arrangement. Linear permanent Halbach arrays consist of assemblies comprising a plurality of magnets with different magnetization directions. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a linear permanent magnet Halbach array has the properties that it is concentrated on one side while being weakened almost to zero on the other side. Typically, linear permanent magnet Halbach arrays comprise one or more non-magnetic blocks made for example of wood or plastic, in particular plastics known to exhibit good self-lubricating properties and wear resistance such as polyacetal (also called polyoxymethylene, POM) resins, and magnets made of high-coercivity magnetic materials such as Neodymium-Iron-Boron (NdFeB).

Carrying out a bi-axial orientation of the platelet-shaped magnetic or magnetizable pigment particles may be carried out by moving the assembly comprising the substrate carrying the coating layer and the one or more negative indicia or one or more positive indicia at an appropriate speed through a magnetic-field-generating device described in EP 1 519 794 B1. Suitable devices include permanent magnets being disposed on each side of the assembly surface, above or below it, such that the magnetic field lines are substantially parallel to the assembly surface.

The process for producing the OEL described herein comprises partially simultaneously with step c) or subsequently to step c), preferably partially simultaneously, a step of hardening (step d)) the coating composition. The step of hardening the coating composition allows the platelet-shaped magnetic or magnetizable pigment particles to be fixed in their adopted positions and orientations in a desired pattern to form the OEL, thereby transforming the coating composition to a second state. However, the time from the end of step c) to the beginning of step d) is preferably relatively short in order to avoid any de-orientation and loss of information. Typically, the time between the end of step c) and the beginning of step d) is less than 1 minute, preferably less than 20 seconds, further preferably less than 5 seconds. It is particularly preferable that there is essentially no time gap between the end of the orientation step c) and the beginning of the curing step d), i.e. that step d) follows immediately after step c) or already starts while step c) is still in progress (partially simultaneously). By "partially simultaneously", it is meant that both steps are partly performed simultaneously, i.e. the times of performing each of the steps partially overlap. In the context described herein, when hardening is performed partially simultaneously with the step c), it must be understood that hardening becomes effective after the orientation so that the platelet-shaped magnetic or magnetizable pigment particles orient before the complete or partial hardening of the OEL. As mentioned herein, the hardening step (step d)) may be performed by using different means or processes depending on the binder material comprised in the coating composition that also comprises the platelet-shaped magnetic or magnetizable pigment particles.

The hardening step generally may be any step that increases the viscosity of the coating composition such that a substantially solid material adhering to the substrate is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts and manganese-containing catalysts); cross-linking reactions or any combination thereof.

Radiation curing is particularly preferred, and UV-Vis light radiation curing is even more preferred, since these technologies advantageously lead to very fast curing processes and hence drastically decrease the preparation time of any article comprising the OEL described herein. Moreover, radiation curing has the advantage of producing an almost instantaneous increase in viscosity of the coating composition after exposure to the curing radiation, thus minimizing any further movement of the particles. In consequence, any loss of orientation after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapor arc lamp, as the source of the actinic radiation.

The process for producing the OEL described herein may further comprise a step e) of releasing or separating the substrate carrying the so-obtained OEL from the one or more negative indicia or one or more positive indicia.

The present invention provides a process to produce an optical effect layer (OEL) on a substrate. The substrate described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metallized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs produced according to the present invention are used for decorative or cosmetic purposes including for example fingernail lacquers, said OEL may be produced on other type of substrates including nails, artificial nails or other parts of an animal or human being.

Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the optical effect layer (OEL) described herein or promote adhesion. Examples of such primer layers may be found in WO 2010/058026 A2.

With the aim of increasing the durability through soiling or chemical resistance and cleanliness and thus the circulation lifetime of an article, a security document or a decorative element or object comprising the optical effect layer (OEL) obtained by the process described herein, or with the aim of modifying their aesthetical appearance (e.g. optical gloss), one or more protective layers may be applied on top of the optical effect layer (OEL). When present, the one or more protective layers are typically made of protective varnishes. These may be transparent or slightly colored or tinted and may be more or less glossy. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the optical effect layer (OEL).

The present invention further provides optical effect layers (OEL) produced by the process according to the present invention.

The optical effect layer (OEL) described herein may be provided directly on a substrate on which it shall remain permanently (such as for banknote applications). Alternatively, an optical effect layer (OEL) may also be provided on a temporary substrate for production purposes, from which the OEL is subsequently removed. This may for example facilitate the production of the optical effect layer (OEL), particularly while the binder material is still in its fluid state. Thereafter, after hardening the coating composition for the production of the optical effect layer (OEL), the temporary substrate may be removed from the OEL.

Alternatively, in another embodiment an adhesive layer may be present on the optical effect layer (OEL) or may be present on the substrate comprising OEL, said adhesive layer being on the side of the substrate opposite to the side where the OEL is provided or on the same side as the OEL and on top of the OEL. Therefore an adhesive layer may be applied to the optical effect layer (OEL) or to the substrate, said adhesive layer being applied after the curing step has been completed. Such an article may be attached to all kinds of documents or other articles or items without printing or other processes involving machinery and rather high effort. Alternatively, the substrate described herein comprising the optical effect layer (OEL) described herein may be in the form of a transfer foil, which can be applied to a document or to an article in a separate transfer step. For this purpose, the substrate is provided with a release coating, on which the optical effect layer (OEL) are produced as described herein. One or more adhesive layers may be applied over the so produced optical effect layer (OEL).

Also described herein are substrates comprising more than one, i.e. two, three, four, etc. optical effect layers (OEL) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the optical effect layer (OEL) produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompasses by the present invention.

Further, all documents referred to throughout this specification are hereby incorporated by reference in their entirety as set forth in full herein.

EXAMPLES

A black commercial paper (Gascogne Laminates M-cote 120) was used as substrate (x10) for the examples described hereafter.

The UV-curable screen printing ink described in Table 1 was used as a coating composition comprising platelet-shaped optically variable magnetic pigment particles so as to form a coating layer (x20). The coating composition was applied onto the substrate (x10), said application being carried out by hand screen printing using a T90 screen so as to form a coating layer (x20) having a thickness of about 20 μm.

TABLE 1

| | |
|---|---|
| Epoxyacrylate oligomer | 36% |
| Trimethylolpropane triacrylate monomer | 13.5% |
| Tripropyleneglycol diacrylate monomer | 20% |
| Genorad ™ 16 (Rahn) | 1% |
| Aerosil ® 200 (Evonik) | 1% |
| Speedcure TPO-L (Lambson) | 2% |
| IRGACURE ® 500 (BASF) | 6% |
| Genocure EPD (Rahn) | 2% |
| Tego ® Foamex N (Evonik) | 2% |
| Plateleted-shaped optically variable magnetic pigment particles (7 layers)(*) | 16.5% |

(*)gold-to-green optically variable magnetic pigment particles having a flake shape of diameter d50 about 9 μm and thickness about 1 μm, obtained from Viavi Solutions, Santa Rosa, CA.

Apparatuses depicted in FIG. 4-8 were used to orient the platelet-shaped optically variable magnetic pigment particles in a coating layer (x20) made of the UV-curable screen printing ink described in Table 1 so as to produce the optical effect layers (OELs) of FIG. 4C-8C.

After having magnetically transferred one or more indicia by moving an assembly (x00) comprising the substrate (x10) carrying the coating layer (x20) and the one or more negative indicia or one or more positive indicia through an inhomogeneous magnetic field of a static magnetic-field-generating device (x60), the magnetically oriented platelet-shaped optically variable pigment particles were, partially simultaneously with the magnetic orientation step, fixed/frozen by UV-curing the coating layer (x20) with a UV-LED-lamp from Phoseon (Type FireFlex 50×75 mm, 395 nm, 8 W/cm$^2$).

Pictures of the so-obtained OELs were taken using the following set-up:
Light source: two white LED array light sources (THORLAB LIU004) positioned at 45° from each side of the OEL
Camera: color camera from Basler (acA2500-14uc) with USB interface, resolution 2590 pixels×1942 pixels
Objective: telecentric lens
Color images were converted to black & white images using a free software (Fiji)

Figure 4A:
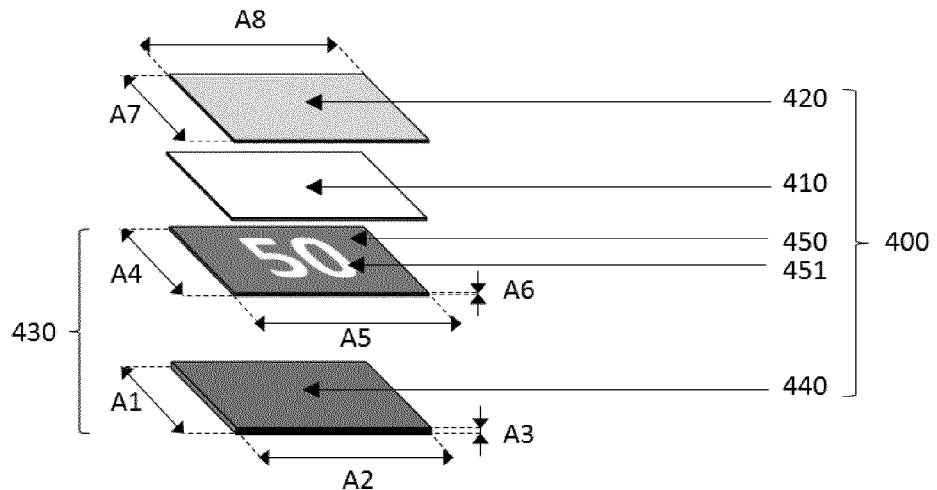
FIG. 4A schematically illustrates an assembly (400) comprising a) a substrate (410) carrying a coating layer (420) made of a coating composition comprising platelet-shaped magnetic or magnetizable pigment particles and b) an arrangement (430) comprising a non-magnetic holder (440) and negative indicia in the form of a soft magnetic metal plate (450) comprising voids (451) having the shape of the indicia.
Figure 4B:
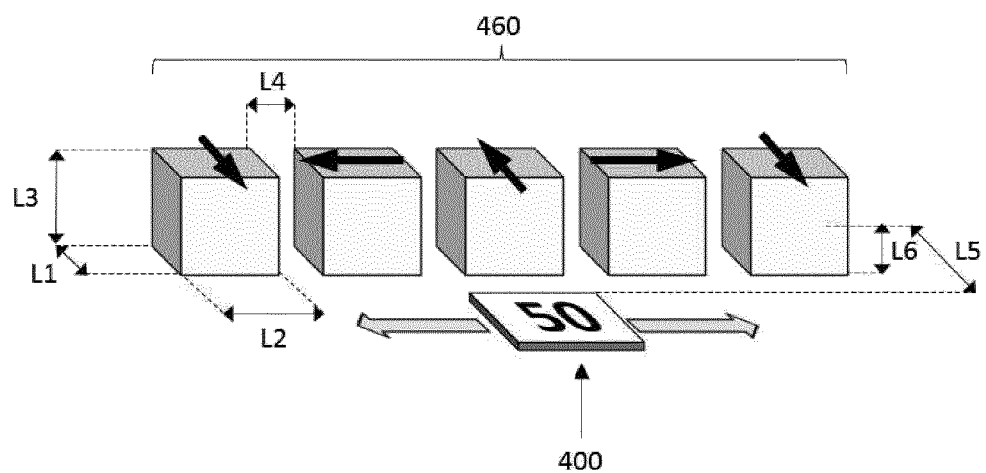
FIG. 4B schematically illustrates a process according to the invention for magnetically transferring one or more indicia into a coating layer (420) so as to produce an optical effect layer (OEL), wherein the assembly (400) of FIG. 4A is moved along a magnetic-field-generating device (460) so as to bi-axially orient at least a part of the platelet-shaped magnetic or magnetizable pigment particles.
Figure 4C:
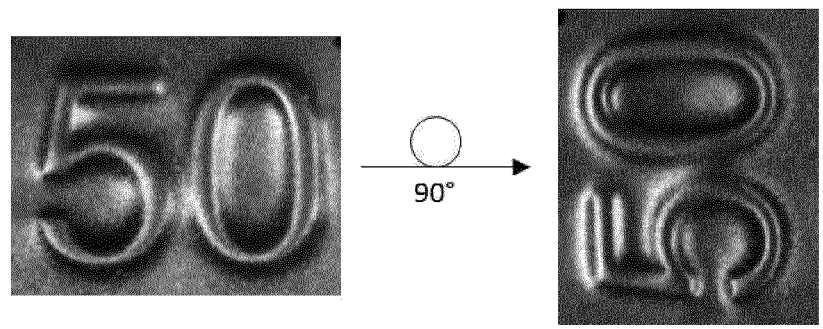
FIG. 4C photographic images of the OEL obtained by using the process shown in FIG. 4B.

Example E1 (FIGS. 4A-4C)

Indicia were magnetically transferred by moving an assembly (400) comprising a) a substrate (410) carrying a coating layer (420) and b) an arrangement (430) comprising a non-magnetic holder (440) made of POM and negative indicia in the form of a nickel foil (450) (i.e. a soft magnetic metal plate) comprising voids (451) having the shape of "50" along a linear permanent magnet Halbach array (460), wherein the nickel foil (450) was attached to the non-magnetic holder (440) with glue.

As shown in FIG. 4A, the non-magnetic holder (440) was square-shaped (A1=A2=30 mm; thickness A3=1 mm). The negative indicia were made from a nickel foil (Goodfellow, purity 99.98%) (450) having the same dimensions (A4=A5=30 mm) as the non-magnetic holder (440) and having a thickness A6 of 50 μm. The voids (451) were cut out using a neodymium-doped fiber laser (Fiber 100, Gravograph) with a power of 10 W. A coating layer (420) (A7=A8=30 mm) made of the UV-curable screen printing ink described in Table 1 was applied onto the substrate (410), and the coated substrate was arranged on top of the arrangement (430), the coating layer (420) facing the environment and the nickel foil (450) being attached above the non-magnetic holder (440). The so-obtained assembly (400) is shown in an exploded view in FIG. 4A only for illustration purposes since there was no gap between the non-magnetic holder (440) and the nickel foil (450) and there was no gap between the nickel foil (450) and the substrate (410).

As shown in FIG. 4B, the linear permanent magnet Halbach array (460) comprised five NdFeB N42 permanent magnets (Webcraft AG). The five permanent magnets (L1=15 mm, L2=15 mm and L3=10 mm) were alternatively magnetized along their length or their width as indicated by the bold arrows in FIG. 4B. The five permanent magnets were fixed in the recesses of a holder (not shown) made of POM (polyoxymethylene). The distance L4 between two permanent magnets was 2 mm.

As shown in FIG. 4B, the assembly (400) was placed at a distance L5=8 mm from the Halbach array (460), at the middle of said Halbach array (i.e. at a distance L6=½ L3=5 mm from the bottom of said Halbach array). The assembly (400) was then moved back and forth four times at a speed of 10 cm/s in the magnetic field generated by the Halbach array (460) and in a direction parallel to said Halbach array (460), the movement of the assembly (400) being confined within said Halbach array (460), so as to magnetically transfer the "50" to the not yet hardened coating composition.

The so-obtained magnetic orientation patterns of the platelet-shaped optically variable pigment particles led to an OEL exhibiting indicia having the shape of "50". The so-obtained magnetic orientation pattern was, partially simultaneously with the magnetic transfer, fixed by UV-curing as described hereabove. This was achieved by switching on the UV-LED-lamp during 2 seconds at the end of the fourth path, while the assembly (400) still experienced the magnetic field generated by the Halbach array (460).

FIG. 4C shows images of E1 under two viewing directions (90° rotation of the OEL). The indicia "50" appeared as a tridimensional object showing an effect protruding from the surface of the OEL. The perceived 3D-effect and the brightness of the so-obtained OEL were identical at the two viewing directions.

Figure 5A:
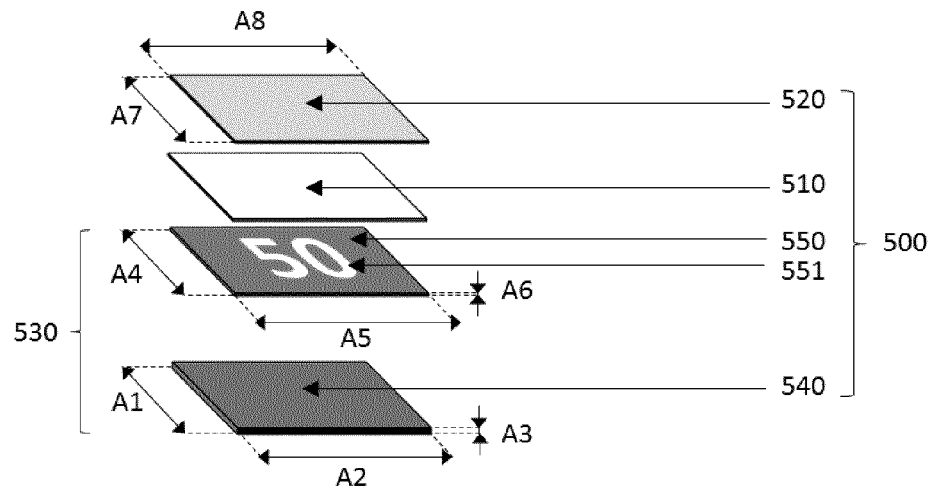
FIG. 5A schematically illustrates an assembly (500) comprising a) a substrate (510) carrying a coating layer (520) made of a coating composition comprising platelet-shaped magnetic or magnetizable pigment particles and b) an arrangement (530) comprising a non-magnetic holder (540) and negative indicia in the form of a soft magnetic metal plate (550) comprising voids (551) having the shape of the indicia.
Figure 5B:
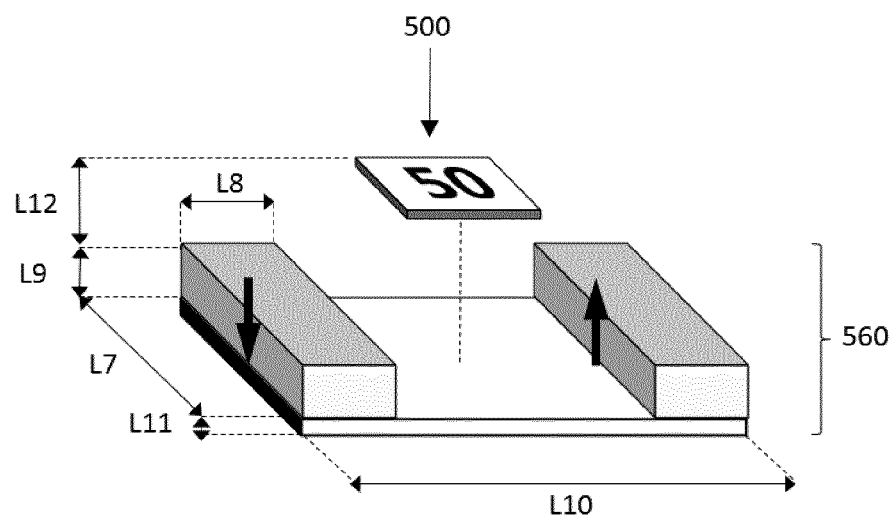
FIG. 5B schematically illustrates a comparative process for magnetically transferring one or more indicia into a coating layer (520) so as to produce an optical effect layer (OEL), wherein the assembly (500) of FIG. 5A is placed above a magnetic-field-generating device (560) so as to orient at least a part of the platelet-shaped magnetic or magnetizable pigment particles.
Figure 5C:
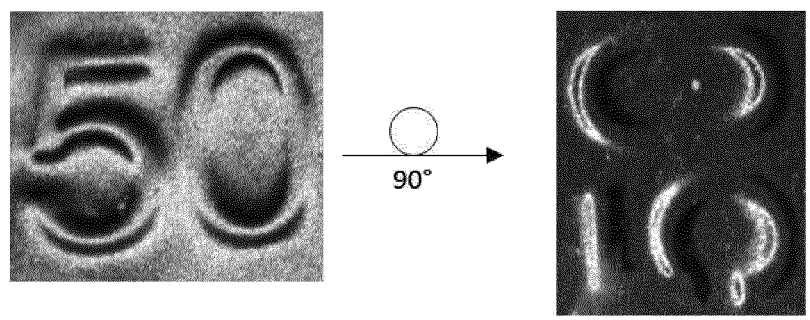
FIG. 5C photographic images of the OEL obtained by using the process shown in FIG. 5B.

Comparative Example C1 (FIGS. 5A-5C)

Indicia were magnetically transferred by placing an assembly (500) comprising a) a substrate (510) carrying a coating layer (520) and b) an arrangement (530) comprising a non-magnetic holder (540) made of POM and negative indicia in the form of a nickel foil (550) (i.e. a soft magnetic metal plate) comprising voids (551) having the shape of "50" on top of a magnetic field-generating device (560) similar to the one described in FIG. 5 of EP 2 155 498 B1, wherein the nickel foil (550) was attached to the non-magnetic holder (540) with glue.

As shown in FIG. 5A, the non-magnetic holder (540) was square-shaped (A1=A2=30 mm; thickness A3=1 mm). The negative indicia was made of a nickel foil (Goodfellow, purity 99.98%) (550) having the same dimensions (A4=A5=30 mm) as the non-magnetic holder (540) and having a thickness A6 of 50 μm. The voids (551) were cut out using a neodymium-doped fiber laser (Fiber 100, Gravograph) with a power of 10 W. A coating layer (520) (A7=A8=30 mm) made of the UV-curable screen printing ink described in Table 1 was applied onto the substrate (510), and the coated substrate was arranged on top of the arrangement (530), the coating layer (520) facing the environment and the nickel foil (550) being attached above the non-magnetic holder (540). The so-obtained assembly (500) is shown in an exploded view in FIG. 5A only for illustration purposes since there was no gap between the non-magnetic holder (540) and the nickel foil (550) and there was no gap between the nickel foil (550) and the substrate (510).

As shown in FIG. 5B, the magnetic-field-generating device (560) comprised two NdFeB N42 permanent magnets (Webcraft AG). The two permanent magnets (L7=40 mm, L8=10 mm and L9=10 mm) were magnetized along their height (L9) and glued at a 44 mm distance from each other on a plate made of POM (L10=64 mm, L7=40 mm, and L11=1 mm), such that the South pole of one permanent magnet and the North pole of the other permanent magnet pointed towards the plate made of POM. The assembly (500) was placed at a distance L12=5 mm from the top surface of said magnetic-field-generating device (560), such that the center of the assembly (500) coincided with the center of the magnetic-field-generating device (560). The assembly (500) was kept static.

The so-obtained magnetic orientation patterns of the platelet-shaped optically variable pigment particles led to an OEL exhibiting indicia having the shape of "50". The so-obtained magnetic orientation pattern was, partially simultaneously with the magnetic transfer, fixed by UV-curing as described hereabove. This was achieved by switching on the UV-LED-lamp during 2 seconds while the assembly (500) still experienced the magnetic field generated by the magnetic-field-generating device (560).

FIG. 5C shows images of C1 under two viewing directions (90° rotation of the OEL). The "50" appeared as a tridimensional object protruding from the surface of the OEL as in E1. However, the perceived "3D-effect" and the brightness of the OEL was different at the two viewing directions, and some parts of the indicia were missing.

Figure 6A:
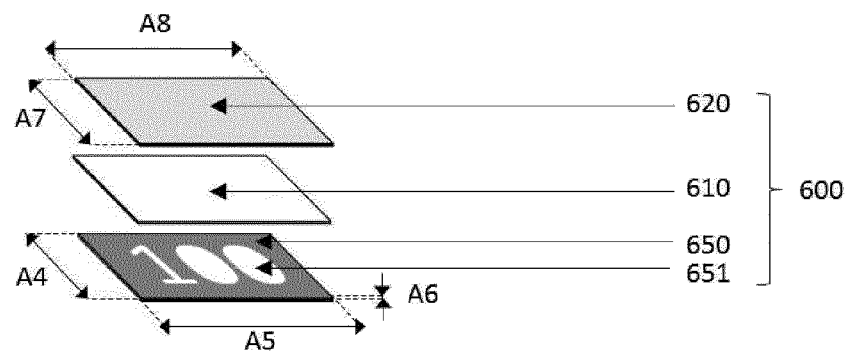
FIG. 6A schematically illustrates an assembly (600) comprising a) a substrate (610) carrying a coating layer (620) made of a coating composition comprising platelet-shaped magnetic or magnetizable pigment particles and b) negative indicia in the form of a soft magnetic composite plate (650) comprising voids (651) having the shape of the indicia.
Figure 6B:
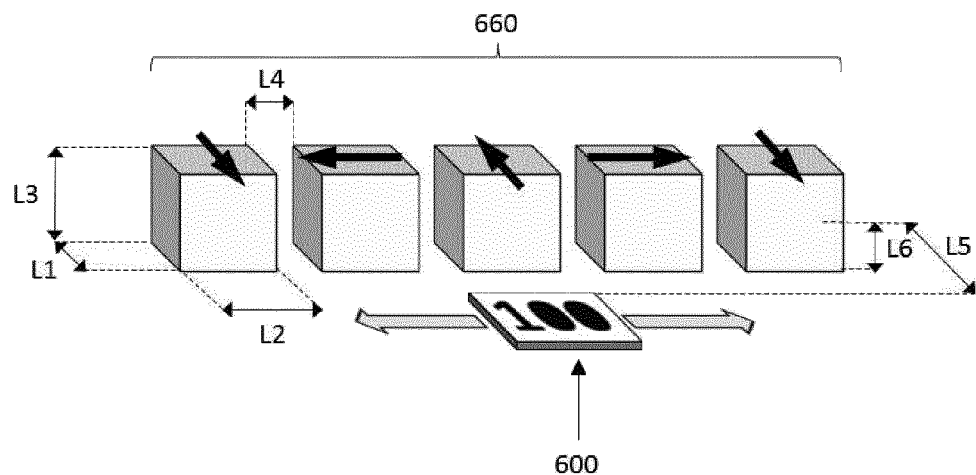
FIG. 6B a process according to the invention for magnetically transferring one or more indicia into a coating layer (620) so as to produce an optical effect layer (OEL), wherein the assembly (600) of FIG. 6A is moved along a magnetic-field-generating device (660) so as to bi-axially orient at least a part of the platelet-shaped magnetic or magnetizable pigment particles.
Figure 6C:
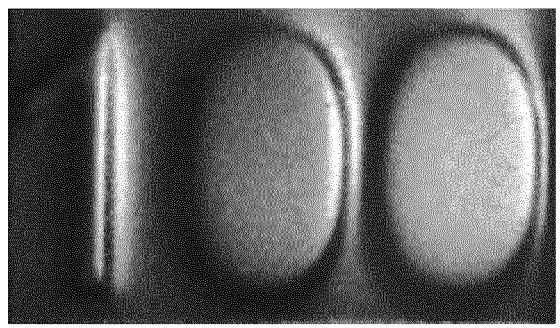
FIG. 6C photographic image of the OEL obtained by using the process shown in FIG. 6B.

Example E2 (FIGS. 6A-6C)

Indicia were magnetically transferred by moving an assembly (600) comprising a) a substrate (610) carrying a coating layer (620) and b) negative indicia in the form of a nickel foil (650) (i.e. a soft magnetic metal plate) comprising voids (651) having the shape of "100" along a linear permanent magnet Halbach array (660).

As shown in FIG. 6A, the negative indicia were made of a nickel foil (Goodfellow, purity 99.98%) (650) having the dimensions A4=A5=30 mm and having a thickness A6 of 50 μm. The voids (651) were cut out using a neodymium-doped fiber laser (Fiber 100, Gravograph) with a power of 10 W. A coating layer (620) (A7=A8=30 mm) made of the UV-curable screen printing ink described in Table 1 was applied onto the substrate (610), and the coated substrate was arranged on top of the nickel foil (650) of the negative indicia, the coating layer (620) facing the environment. The so-obtained assembly (600) is shown in an exploded view in FIG. 6A only for illustration purposes since there was no gap between the nickel foil (650) and the substrate (610).

As shown in FIG. 6B, the linear permanent magnet Halbach array (660) comprised five NdFeB N42 permanent magnets (Webcraft AG). The five permanent magnets (L1=15 mm, L2=15 mm and L 3=10 mm) were alternatively magnetized along their length or their width, as indicated by the bold arrows on FIG. 6B. The five permanent magnets were placed in the recesses of a holder (not shown) made of POM (polyoxymethylene), the distance L4 between two permanent magnets was 2 mm.

As shown in FIG. 6B, the assembly (600) was placed at a distance L5=8 mm from the magnet Halbach array (660), at the middle of its height (i.e. at a distance L6=½ L3=5 mm from the bottom of said Halbach array (660). The assembly (600) was then moved back and forth four times at a speed of 10 cm/s in the magnetic field generated by the Halbach array (660), the movement being confined within said Halbach array (660) and in a direction parallel to said Halbach array (660), so as to magnetically transfer the "100" to the not yet hardened coating composition.

The so-obtained magnetic orientation patterns of the platelet-shaped optically variable pigment particles led to an OEL exhibiting indicia having the shape of "100". The so-obtained magnetic orientation pattern was, partially simultaneously with the magnetic transfer, fixed by UV-curing as described hereabove. This was achieved by switching on the UV-LED-lamp during 2 seconds at the end of the fourth path, while the assembly (600) still experienced the magnetic field generated by the Halbach array (660).

FIG. 6C shows an image of E2. The indicia "100" appeared as a tridimensional object showing an effect protruding from the surface of the OEL. The perceived 3D-effect and the brightness of the so-obtained OEL were identical at all viewing directions.

Figure 7A:
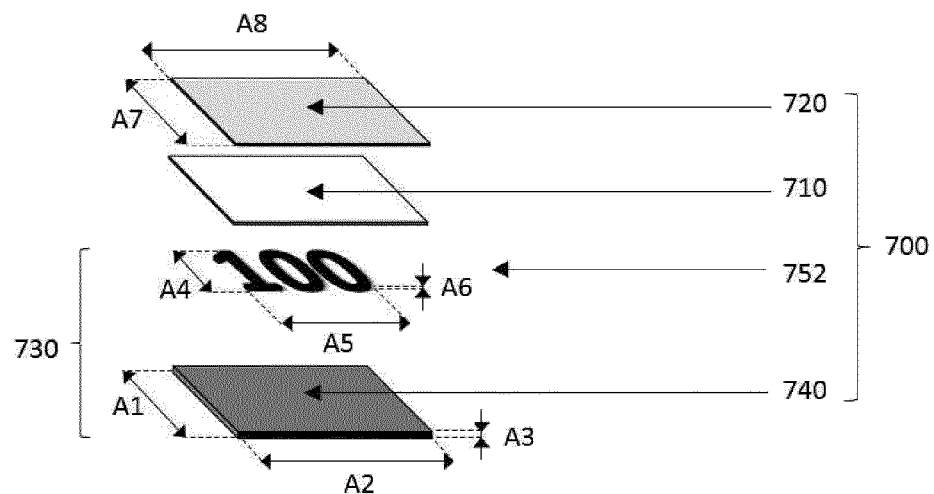
FIG. 7A schematically illustrates an assembly (700) comprising a) a substrate (710) carrying a coating layer (720) made of a coating composition comprising platelet-shaped magnetic or magnetizable pigment particles and b) an arrangement (730) comprising a non-magnetic holder (740) and positive indicia (752).
Figure 7B:
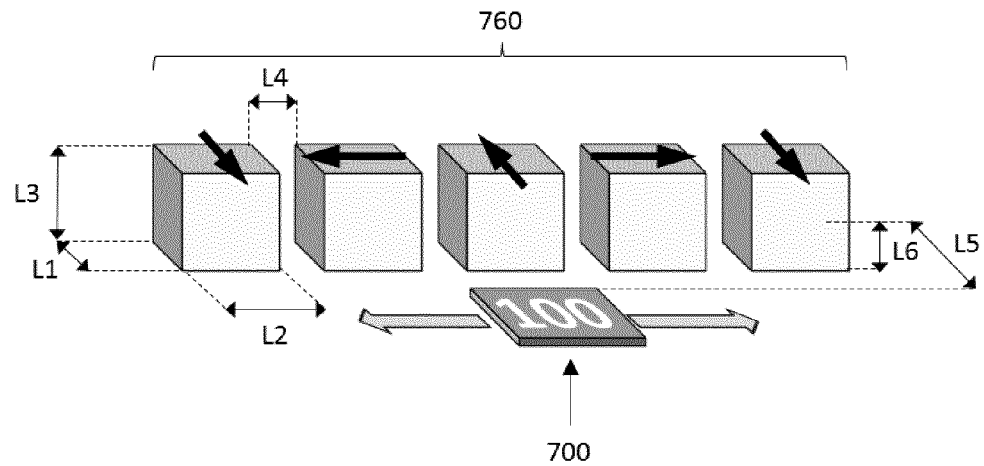
FIG. 7B schematically illustrates a process according to the invention for magnetically transferring one or more indicia into a coating layer (720) so as to produce an optical effect layer (OEL), wherein the assembly (700) of FIG. 7A is moved along a magnetic-field-generating device (760) so as to bi-axially orient at least a part of the platelet-shaped magnetic or magnetizable pigment particles.
Figure 7C:
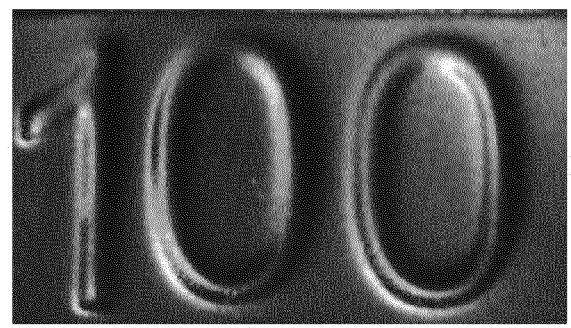
FIG. 7C photographic images of the OEL obtained by using the process shown in FIG. 7B.

Example E3 (FIGS. 7A-7C)

Indicia were magnetically transferred by moving an assembly (700) comprising a) a substrate (710) carrying a coating layer (720) and b) an arrangement (730) comprising a non-magnetic holder (740) made of POM and positive indicia (752) made of nickel and having the shape of "100" along a linear permanent magnet Halbach array (760), wherein the positive indicia (752) were attached to the non-magnetic holder (740) with glue.

As shown in FIG. 7A, the non-magnetic holder (740) was square-shaped (A1=A2=30 mm; thickness A3=1 mm). The positive indicia (752) were made from a nickel foil (Goodfellow, purity 99.98%). The material around the indicia (752) and the interior of the "0" were removed using a neodymium-doped fiber laser (Fiber 100, Gravograph) with a power of 10 W. The "100" had the dimensions A4=10 mm, A5=20 mm and A6=50 μm. A coating layer (720) (A7=A8=30 mm) made of the UV-curable screen printing ink described in Table 1 was applied onto the substrate (710), and the coated substrate was arranged on top of the arrangement (730), the coating layer (720) facing the environment and the positive indicia (752) facing the substrate (710) (i.e. the positive indicia were attached above the non-magnetic holder (740)). The so-obtained assembly (700) is shown in an exploded view in FIG. 7A only for illustration purposes since there was no gap between the non-magnetic holder (740) and the positive indicia (752) there was no gap between the positive indicia (752) and the substrate (710) and there was no gap between the positive indicia (752) and the non-magnetic holder (740).

As shown in FIG. 7B, the linear permanent magnet Halbach array (760) comprised five NdFeB N42 permanent magnets (Webcraft AG). The five permanent magnets (L1=15 mm, L2=15 mm and L3=10 mm) were alternatively magnetized along their length or their width as indicated by the bold arrows on FIG. 7B. The five permanent magnets were fixed in the recesses of a holder (not shown) made of POM (polyoxymethylene). The distance L4 between two permanent magnets was 2 mm.

As shown in FIG. 7B, the assembly (700) was placed at a distance L5=8 mm from the Halbach array (760), at the middle of its height (i.e. at a distance L6=½ L3=5 mm from the bottom of said Halbach array). The assembly (700) was then moved back and forth four times at a speed of 10 cm/s in the magnetic field generated by the Halbach array (760), the movement being confined within said Halbach array (760) and in a direction parallel to said Halbach array (760), so as to magnetically transfer the "100" to the not yet hardened coating composition.

The so-obtained magnetic orientation patterns of the platelet-shaped optically variable pigment particles led to an OEL exhibiting indicia having the shape of "100". The so-obtained magnetic orientation pattern was, partially simultaneously with the magnetic transfer, fixed by UV-curing as described hereabove. This was achieved by switching on the UV-LED-lamp during 2 seconds at the end of the fourth path, while the assembly (700) still experienced the magnetic field generated by the Halbach array (760).

FIG. 7C shows an image of E3. The indicia "100" appeared as a tridimensional object showing a effect inside the OEL. The perceived 3D-effect and the brightness of the so-obtained OEL were identical at all viewing directions.

Figure 8A:
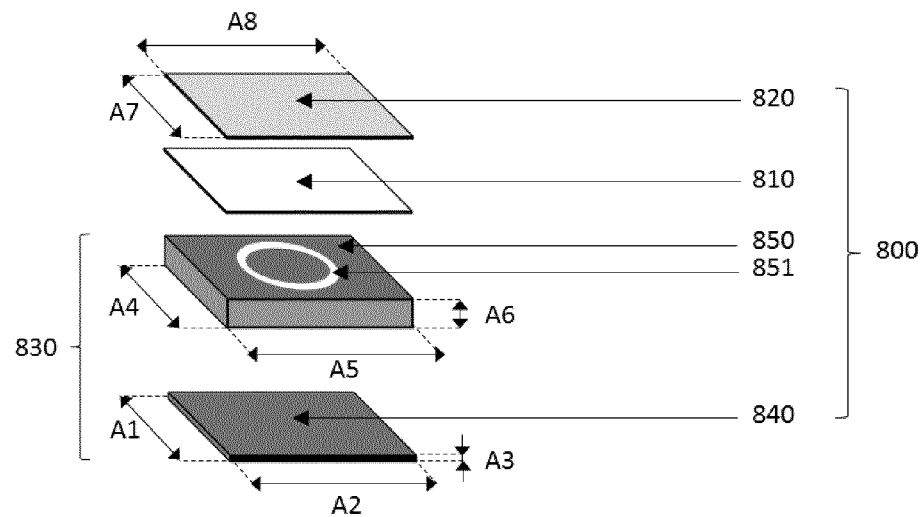
FIG. 8A schematically illustrates an assembly (800) comprising a) a substrate (810) carrying a coating layer (820) made of a coating composition comprising platelet-shaped magnetic or magnetizable pigment particles and b) an arrangement (830) comprising a non-magnetic holder (840) and a negative indicium in the form of a soft magnetic composite plate (850) comprising a void (851) having the shape of the indicium.
Figure 8B:
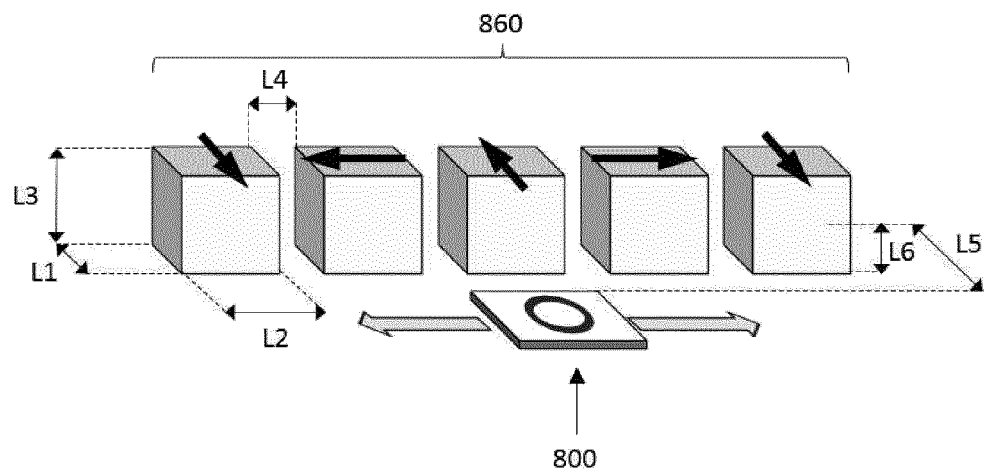
FIG. 8B schematically illustrates a process according to the invention for magnetically transferring one or more indicia into a coating layer (820) so as to produce an optical effect layer (OEL), wherein the assembly (800) of FIG. 8A is moved along a magnetic field-generating device (860) so as to bi-axially orient at least a part of the platelet-shaped magnetic or magnetizable pigment particles.
Figure 8C:
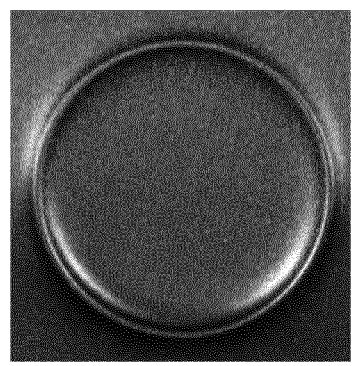
FIG. 8C photographic images of the OEL obtained by using the process shown in FIG. 8B.

Example E4 (FIGS. 8A-8C)

An indicium was magnetically transferred by moving an assembly (800) comprising a) a substrate (810) carrying a coating layer (820) and b) an arrangement (830) comprising a non-magnetic holder (840) made of POM and an negative indicium in the form of a soft magnetic composite plate (850) comprising a void (851) having the shape of a circle along a linear permanent magnet Halbach array (860), wherein soft magnetic composite plate (850) was attached to the non-magnetic holder (840) with glue.

As shown in FIG. 8A, the non-magnetic holder (840) was square-shaped (A1=A2=30 mm; thickness A3=1 mm). The soft magnetic composite plate (850) had the composition indicated in Table 2.

TABLE 2

| Ingredients | |
|---|---|
| Epoxy resin (1170 from PHD-24) | 13.6 wt-% |
| Hardener (130 from PHD-24) | 4.4 wt-% |
| Carbonyl iron powder carbonyl iron powder (CIP), BASF, spherical shape, $d_{50}$ = 4-6 μm, density 7.7 kg/dm³ | 82 wt-% |

The soft magnetic composite plate (850) was prepared by thoroughly mixing the ingredients of Table 2 during three minutes in a speed mixer (Flack Tek Inc DAC 150 SP) at 2500 rpm. The mixture was then poured in a silicon mould and left three days to be completely hardened. The so-obtained soft magnetic composite plate (850) had the dimensions A4=A5=30 mm and A6=1 mm, as indicated in FIG. 8A.

A circle having a diameter of 20 mm was mechanically cut-out in the so-obtained soft magnetic composite plate (850) by using a 0.5 mm diameter mesh (computer-controlled mechanical engraving machine, IS500 from Gravograph).

A coating layer (820) (A7=A8=30 mm) made of the UV-curable screen printing ink described in Table 1 was applied onto the substrate (810) and the coated substrate was arranged on top of the arrangement comprising the negative indicium in the form of the soft magnetic composite plate (850) comprising a void (851) and the non-magnetic holder (840), the coating layer (820) facing the environment and the soft magnetic composite plate (850) being attached above the non-magnetic holder (840).

The so-obtained assembly (800) is shown in an exploded view in FIG. 8A only for illustration purposes since there was no gap between the non-magnetic holder (840) and the soft magnetic composite plate (850) and there was no gap between the soft magnetic composite plate (850) and the substrate (810).

As shown in FIG. 8B, the linear permanent magnet Halbach array (860) comprised five NdFeB N42 permanent magnets (Webcraft AG). The five permanent magnets (L1=15 mm, L2=15 mm and L3=10 mm) were alternatively magnetized along their length or their width as indicated by the bold arrows on FIG. 8B. The five permanent magnets were fixed in the recesses of a holder (not shown) made of POM (polyoxymethylene). The distance L4 between two permanent magnets was 2 mm.

As shown in FIG. 8B, the assembly (800) was placed at a distance L5=8 mm from the Halbach array (860), at the middle of said Halbach array (i.e. at a distance L6=½ L3=5 mm from the bottom of said Halbach array). The assembly (800) was then moved back and forth four times at a speed of 10 cm/s in the magnetic field generated by the Halbach array (860) and in a direction parallel to said Halbach array (860), the movement of the assembly (800) being confined within said Halbach array (860), so as to magnetically transfer the circle to the not yet hardened coating composition.

The so-obtained magnetic orientation patterns of the platelet-shaped optically variable pigment particles led to an OEL exhibiting an indicium having the shape of a circle. The so-obtained magnetic orientation pattern was, partially simultaneously with the magnetic transfer, fixed by UV-curing as described hereabove. This was achieved by switching on the UV-LED-lamp during 2 seconds at the end of the fourth path, while the assembly (800) still experienced the magnetic field generated by the Halbach array (860).

FIG. 8C shows an image of E4. The circle appeared as a tridimensional object showing an effect protruding from the surface of the OEL. The perceived 3D-effect and the brightness of the so-obtained OEL was identical at all viewing directions.

Example E5 (FIGS. 9A-D)

Indicia having the shape of "ABC" letters were magnetically transferred by moving an assembly (900) comprising a) a substrate (910) carrying a coating layer (920) and b) an arrangement (930) comprising a non-magnetic holder (940) made of POM and negative indicia in the form of a soft magnetic composite plate (950) comprising voids (951) having the shape of "ABC" letters into a magnetic-field-generating device (960), wherein the soft magnetic composite plate (950) was attached to the non-magnetic holder (940) with glue.

The non-magnetic holder (940) was similar to one used for E4, i.e. was square-shaped (A1=A2=30 mm; thickness A3=1 mm) and the soft magnetic composite plate (950) had the same composition as E4.

The soft magnetic composite plate (950) was prepared by thoroughly mixing the ingredients of Table 2 during three minutes in a speed mixer (Flack Tek Inc DAC 150 SP) at 2500 rpm. The mixture was then poured in a silicon mould and left three days to be completely hardened. The so-obtained soft magnetic composite plate (950) had the dimensions A4=34 mm, A5=20 mm and A6=2 mm, as indicated in FIG. 9A.

Indicia having the shape of "ABC" letters were mechanically cut-out in the so-obtained soft magnetic composite plate (950) by using a 0.5 mm diameter mesh (computer-controlled mechanical engraving machine, IS500 from Gravograph).

A coating layer (920) (A7=34 mm and A8=20 mm) made of the UV-curable screen printing ink described in Table 1 was applied onto the substrate (910) and the coated substrate was arranged on top of the arrangement comprising the negative indicia in the form of the soft magnetic composite plate (950) comprising voids (951) and the non-magnetic holder (940), the coating layer (920) facing the environment and the soft magnetic composite plate (950) being attached above the non-magnetic holder (940).

Figure 9A:
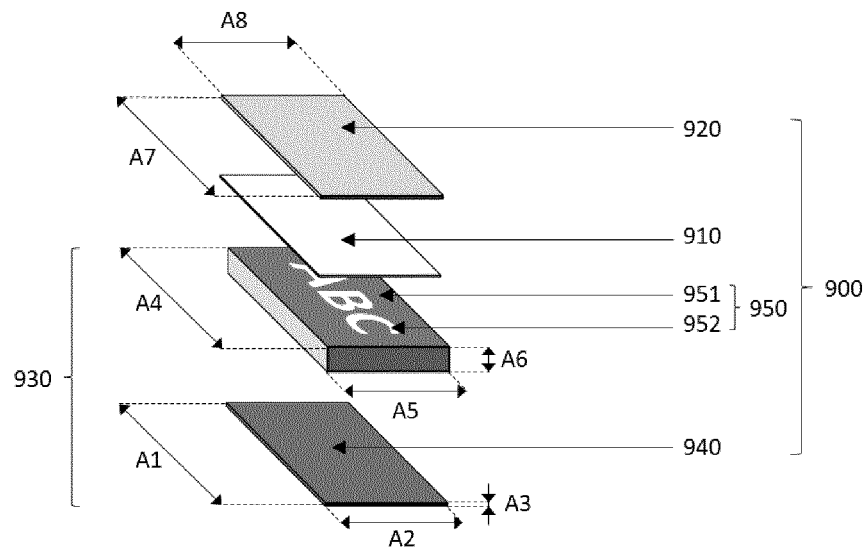
FIG. 9A schematically illustrates an assembly (900) comprising a) a substrate (910) carrying a coating layer (920) made of a coating composition comprising platelet-shaped magnetic or magnetizable pigment particles and b) an arrangement (930) comprising a non-magnetic holder (940) and negative indicia in the form of a soft magnetic composite plate (950) comprising voids (951) having the shape of the indicia.

The so-obtained assembly (900) is shown in an exploded view in FIG. 9A only for illustration purposes since there was no gap between the non-magnetic holder (940) and the soft magnetic composite plate (950) and there was no gap between the soft magnetic composite plate (950) and the substrate (910).

Figure 9B:
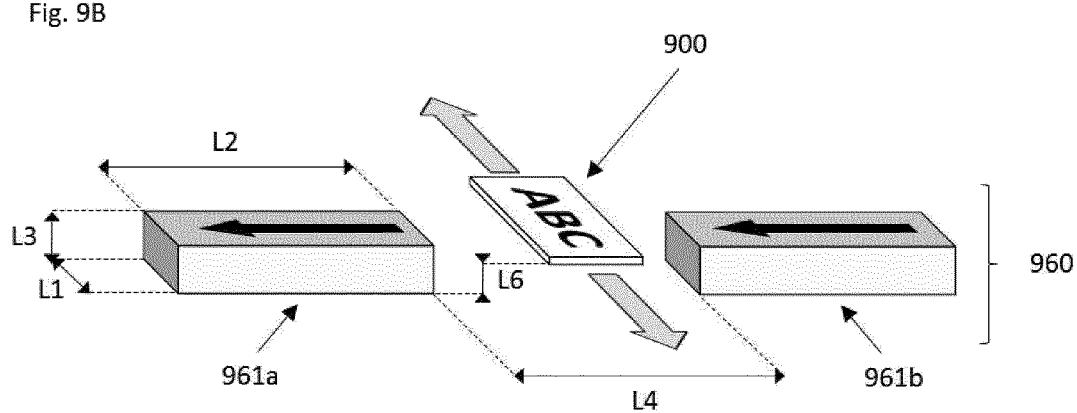
FIG. 9B-C schematically illustrate a process according to the invention for magnetically transferring one or more indicia into a coating layer (920) so as to produce an optical effect layer (OEL), wherein the assembly (900) of FIG. 9A is moved through a magnetic-field-generating device (960) so as to bi-axially orient at least a part of the platelet-shaped magnetic or magnetizable pigment particles.
Figure 9C:
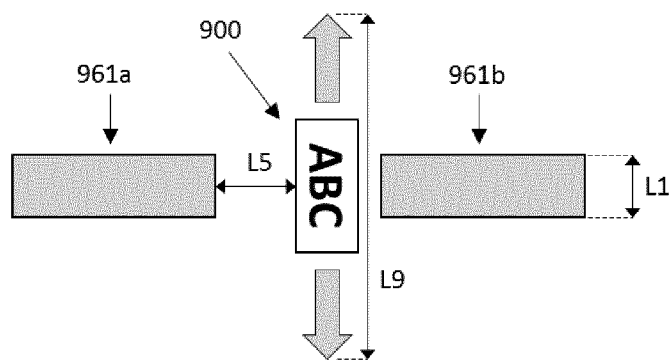

As shown in FIG. 9B-C, the platelet-shaped optically variable magnetic pigment particles were magnetically oriented by transferring the assembly (900) described hereabove to the magnetic field of the magnetic-field-generating device (960) comprising two permanent magnets (961a and 961b) made of NdFeB N45 (Webcraft AG, L1=20 mm, L2=50 mm, L3=10 mm), wherein each of said two permanent magnets (961a and 961b) had its magnetic axis parallel to and in the plane of the substrate (910) surface and was magnetized along their L2 dimension, and wherein said two permanent magnets (961a and 961b) had the same magnetic direction. The distance (L4) between the two permanent magnets (961a and 961b) was 45 mm.

As shown in FIG. 9B-C, the assembly (900) was placed in the space between the two permanent magnets (961a and 961b) at a vertical distance L6=5 mm from the bottom surface of said the two permanent magnets (961a and 961b) and at an horizontal distance L5=18 mm from the first permanent magnet (961a), the top and bottom sides of the indicia facing the distance L1 of the two permanent magnets (961a and 961b).

The assembly (900) was moved (see arrows) back and forth eight times at a linear speed of 10 cm/s in the magnetic field generated by the said two permanent magnets of the magnetic-field-generating device (960) and in a direction parallel to the dimension L1 of said two permanent magnets (961a and 961b). The total extent of the movement (L9) was about 100 mm.

The so-obtained magnetic orientation pattern of the platelet-shaped optically variable pigment particles led to an OEL exhibiting indicia having the shape of "ABC" letters. Said so-obtained magnetically induced orientation pattern was, partially simultaneously with the magnetic orientation, fixed by UV-curing as described hereabove. This was achieved by exposing the assembly (900) to the UV-LED-lamp during 2 seconds at the end of the last pass, said assembly (900) being subsequently removed from the field generated by the magnetic-field-generating device (960).

Figure 9D:
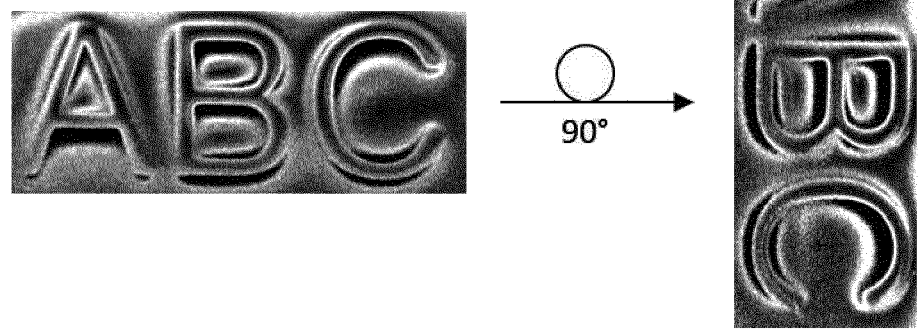
FIG. 9D photographic images of the OEL obtained by using the process shown in FIG. 9B-C.

FIG. 9D shows images of E5 at two viewing directions (90° angle) and obtained as described hereabove. Indicia having the shape of "ABC" letters appeared as a tridimensional object showing an effect protruding from the surface of the OEL. The perceived 3D-effect and the brightness of the so-obtained OEL was identical at all viewing directions.

Example E6 (FIGS. 10A-D)

Indicia having the shape of "ABC" letters were magnetically transferred by moving an assembly (1000) comprising a) a substrate (1010) carrying a coating layer (1020) and b) an arrangement (1030) comprising a non-magnetic holder made of POM and negative indicia in the form of a soft magnetic composite plate (1050) comprising voids (1051) having the shape of "ABC" letters into a magnetic-field-generating device (1060), wherein soft magnetic composite plate (1050) was attached to the non-magnetic holder with glue.

The non-magnetic holder (1040) was similar to one used for E4, i.e. was square-shaped (A1=A2=30 mm; thickness A3=1 mm) and the soft magnetic composite plate (950) had the same composition as E4.

The soft magnetic composite plate (1050) was prepared by thoroughly mixing the ingredients of Table 2 during three minutes in a speed mixer (Flack Tek Inc DAC 150 SP) at 2500 rpm. The mixture was then poured in a silicon mould and left three days to be completely hardened. The so-obtained soft magnetic composite plate (1050) had the dimensions A4=34 mm, A5=20 mm and A6=2 mm, as indicated in FIG. 10A.

Indicia having the shape of "ABC" letters were mechanically cut-out in the so-obtained soft magnetic composite plate (1050) by using a 0.5 mm diameter mesh (computer-controlled mechanical engraving machine, IS500 from Gravograph).

A coating layer (1020) (A7=34 mm and A8=20 mm) made of the UV-curable screen printing ink described in Table 1 was applied onto the substrate (1010) and the coated substrate was arranged on top of the arrangement comprising the negative indicia in the form of the soft magnetic composite plate (1050) comprising voids (1051) and the non-magnetic holder, the coating layer (1020) facing the environment and the soft magnetic composite plate (1050) being attached above the non-magnetic holder.

Figure 10A:
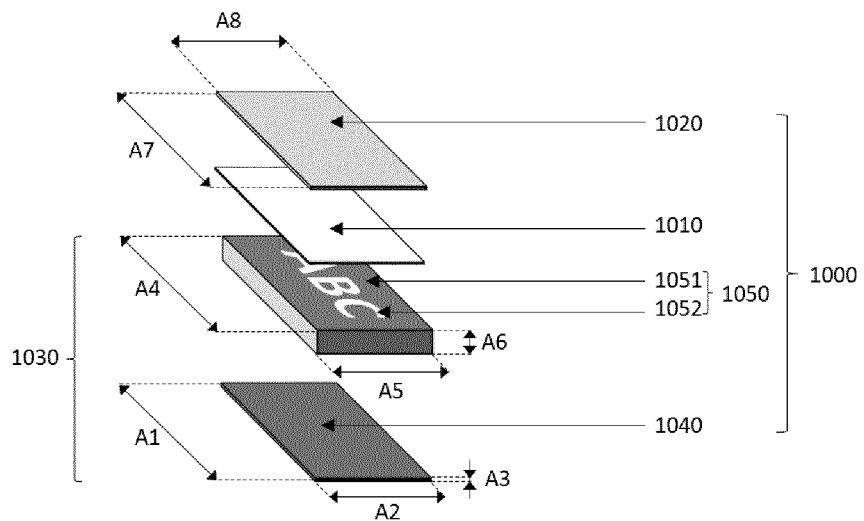
FIG. 10A schematically illustrates an assembly (1000) comprising a) a substrate (1010) carrying a coating layer (1020) made of a coating composition comprising platelet-shaped magnetic or magnetizable pigment particles and b) an arrangement (1030) comprising a non-magnetic holder (1040) and negative indicia in the form of a soft magnetic composite plate (1050) comprising voids (1051) having the shape of the indicia.

The so-obtained assembly (1000) is shown in an exploded view in FIG. 10A only for illustration purposes since there was no gap between the non-magnetic holder and the soft magnetic composite plate (1050) and there was no gap between the soft magnetic composite plate (1050) and the substrate (1010).

Figure 10B:
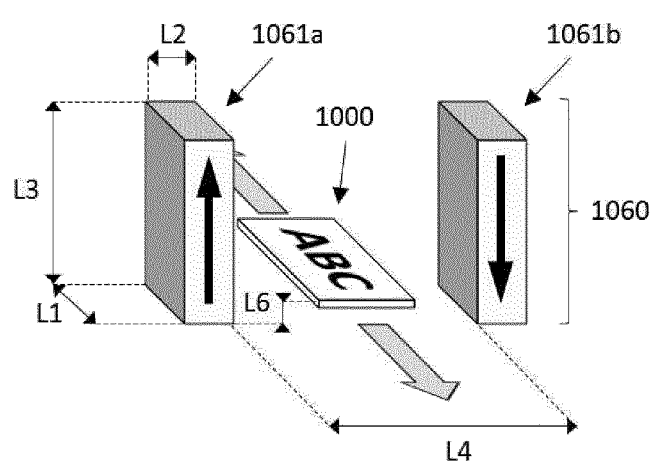
FIG. 10B-C schematically illustrate a process according to the invention for magnetically transferring one or more indicia into a coating layer (1020) so as to produce an optical effect layer (OEL), wherein the assembly (1000) of FIG. 10A is moved through a magnetic-field-generating device (1060) so as to bi-axially orient at least a part of the platelet-shaped magnetic or magnetizable pigment particles.
Figure 10C:
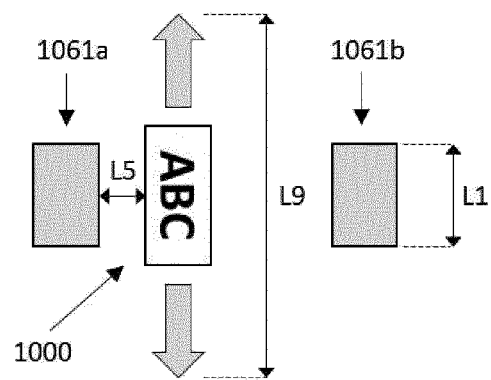

As shown in FIG. 10B-C, the platelet-shaped optically variable magnetic pigment particles were magnetically oriented by transferring the assembly (1000) described hereabove to the magnetic field of the magnetic-field-generating device (1060) comprising two permanent magnets (1061a and 1061b) made of NdFeB N45 (Webcraft AG, L1=20 mm, L2=50 mm, L3=10 mm), wherein each of said two permanent magnets had its magnetic axis perpendicular to the substrate (1020) surface and was magnetized along their L3 dimension, and wherein said two permanent magnets (1061a and 1061b) had an opposite magnetic direction (one of said magnets having its North pole pointing towards the substrate (1020) surface and the other having its South pole pointing towards the substrate (1020) surface). The distance (L4) between the two permanent magnets (1061*a* and 1061*b*) was 47 mm As shown in FIG. 10B-C, the assembly (1000) was placed in the space between the two permanent magnets (1061*a* and 1061*b*) at a vertical distance L6=3 mm from the bottom surface of said the two permanent magnets (1061*a* and 961*b*) and at an horizontal distance L5=5 mm from the first permanent magnet (1061*a*), the top and bottom sides of the indicia facing the distance L1 of the two permanent magnets (1061*a* and 1061*b*).

The assembly (1000) was moved (see arrows) back and forth eight times at a linear speed of 10 cm/s in the magnetic field generated by the said two permanent magnets of the magnetic-field-generating device (1060) and in a direction parallel to the dimension L1 of said two permanent magnets (1061*a* and 1061*b*). The total extent of the movement (L9) was about 100 mm.

The so-obtained magnetic orientation pattern of the platelet-shaped optically variable pigment particles led to an OEL exhibiting indicia having the shape of "ABC" letters. Said so-obtained magnetically induced orientation pattern was, partially simultaneously with the magnetic orientation, fixed by UV-curing as described hereabove. This was achieved by exposing the assembly (1000) to the UV-LED-lamp during 2 seconds at the end of the last pass, said assembly (1000) being subsequently removed from the field generated by the magnetic-field-generating device (1060).

Figure 10D:
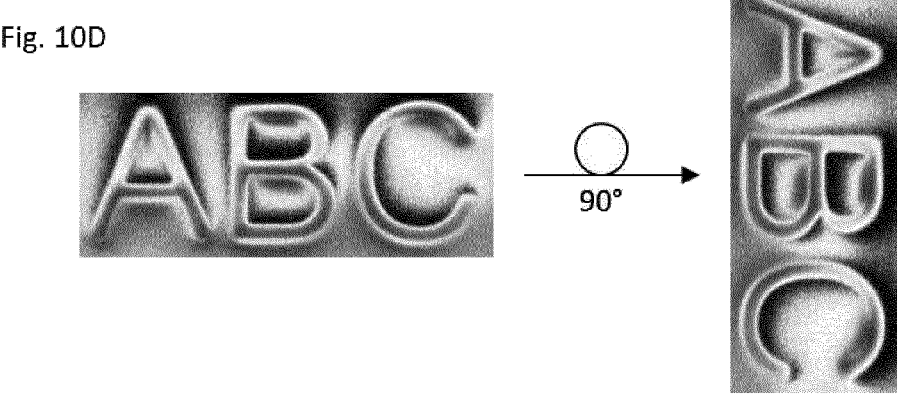
FIG. 10D photographic images of the OEL obtained by using the process shown in FIG. 10B-C.

FIG. 10D shows images of E6 at two viewing directions (90° angle) and obtained as described hereabove. Indicia having the shape of "ABC" letters appeared as a tridimensional object showing an effect protruding from the surface of the OEL. The perceived 3D-effect and the brightness of the so-obtained OEL was identical at all viewing directions.

Example E7 (FIGS. 11A-D)

Indicia having the shape of "ABC" letters were magnetically transferred by moving an assembly (1100) comprising a) a substrate (1110) carrying a coating layer (1120) and b) an arrangement (1130) comprising a non-magnetic holder (not shown) made of POM and negative indicia in the form of a soft magnetic composite plate (1150) comprising voids (1151) having the shape of "ABC" letters into a magnetic-field-generating device (1160), wherein soft magnetic composite plate (1150) was attached to the non-magnetic holder (1140) with glue.

The non-magnetic holder (940) was similar to one used for E4, i.e. was square-shaped (A1=A2=30 mm; thickness A3=1 mm) and the soft magnetic composite plate (1150) had the same composition as E4.

The soft magnetic composite plate (1150) was prepared by thoroughly mixing the ingredients of Table 2 during three minutes in a speed mixer (Flack Tek Inc DAC 150 SP) at 2500 rpm. The mixture was then poured in a silicon mould and left three days to be completely hardened. The so-obtained soft magnetic composite plate (1150) had the dimensions A4=34 mm, A5=20 mm and A6=2 mm, as indicated in FIG. 11A.

Indicia having the shape of "ABC" letters were mechanically cut-out in the so-obtained soft magnetic composite plate (1150) by using a 0.5 mm diameter mesh (computer-controlled mechanical engraving machine, IS500 from Gravograph).

A coating layer (1120) (A7=34 mm and A8=20 mm) made of the UV-curable screen printing ink described in Table 1 was applied onto the substrate (1110) and the coated substrate was arranged on top of the arrangement comprising the negative indicia in the form of the soft magnetic composite plate (1150) comprising voids (1151) and the non-magnetic holder, the coating layer (1120) facing the environment and the soft magnetic composite plate (1150) being attached above the non-magnetic holder.

Figure 11A:
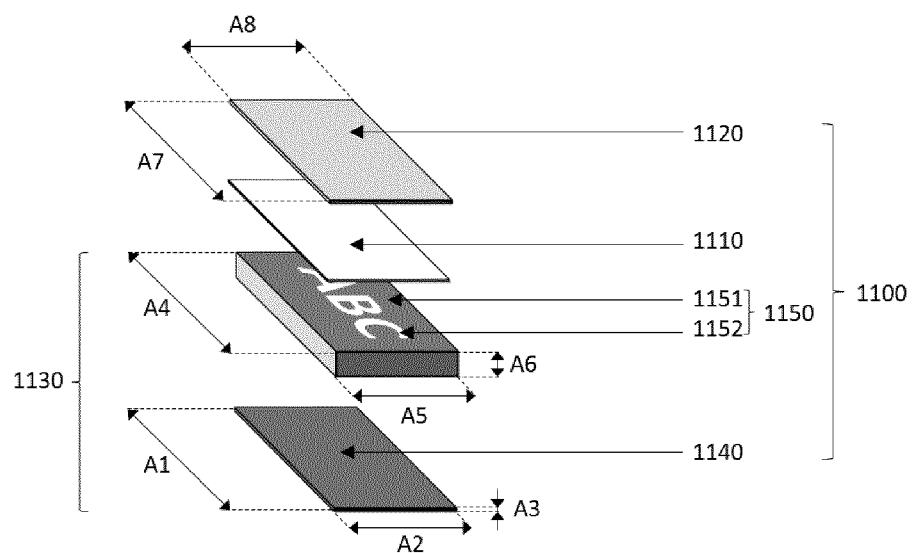
FIG. 11A schematically illustrates an assembly (1100) comprising a) a substrate (1110) carrying a coating layer (1120) made of a coating composition comprising platelet-shaped magnetic or magnetizable pigment particles and b) an arrangement (1130) comprising a non-magnetic holder (1140) and negative indicia in the form of a soft magnetic composite plate (1150) comprising voids (1151) having the shape of the indicia.

The so-obtained assembly (1100) is shown in an exploded view in FIG. 11A only for illustration purposes since there was no gap between the non-magnetic holder and the soft magnetic composite plate (1150) and there was no gap between the soft magnetic composite plate (1150) and the substrate (1110).

Figure 11B:
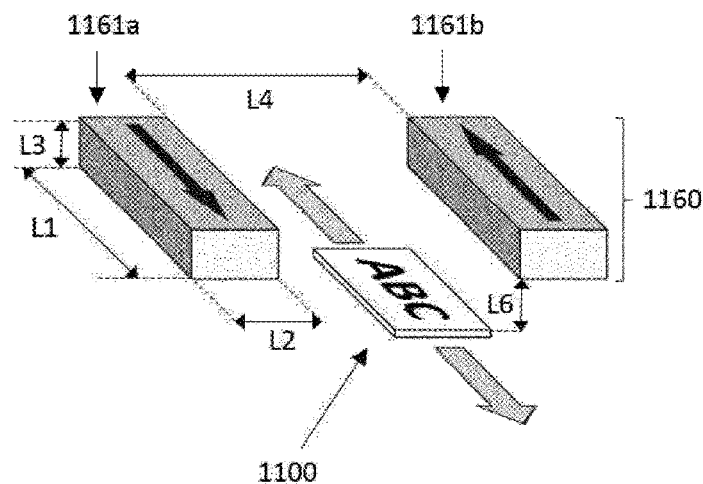
FIG. 11B-C schematically illustrates a process according to the invention for magnetically transferring one or more indicia into a coating layer (1120) so as to produce an optical effect layer (OEL), wherein the assembly (1100) of FIG. 11A is moved through a magnetic-field-generating device (1160) so as to bi-axially orient at least a part of the platelet-shaped magnetic or magnetizable pigment particles.
Figure 11C:
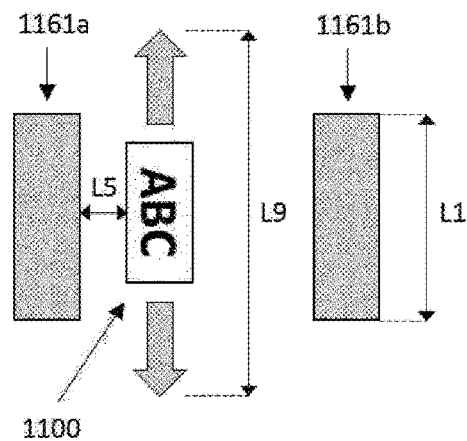

As shown in FIG. 11B-C, the platelet-shaped optically variable magnetic pigment particles were magnetically oriented by transferring the assembly (1100) described hereabove to the magnetic field of the magnetic-field-generating device (1160) comprising two permanent magnets (1161*a* and 1161*b*) made of NdFeB N45 (Webcraft AG, L1=20 mm, L2=50 mm, L3=10 mm), wherein each of said two permanent magnets (1161*a* and 1161*b*) had its magnetic axis parallel to the substrate (1120) surface and was magnetized along their L1 dimension and said two permanent magnets (1161*a* and 1161*b*) had an opposite magnetic direction. The distance (L4) between the two permanent magnets (1161*a* and 1161*b*) was 50 mm.

As shown in FIG. 11B-C, the assembly (1100) was placed below the two permanent magnets (1161*a* and 1161*b*) at a vertical distance L6=2 mm from the bottom surface of said the two permanent magnets (1161*a* and 1161*b*) and at an horizontal distance L5=10 mm from the first permanent magnet (1161*a*), the top and bottom sides of the indicia facing the distance L1 of the two permanent magnets (1161*a* and 1161*b*).

The assembly (1100) was moved (see arrows) back and forth eight times at a linear speed of 10 cm/s in the magnetic field generated by the said two permanent magnets of the magnetic-field-generating device (1160) and in a direction parallel to the dimension L1 of said two permanent magnets (1161*a* and 1161*b*). The total extent of the movement (L9) was about 130 mm.

The so-obtained magnetic orientation pattern of the platelet-shaped optically variable pigment particles led to an OEL exhibiting indicia having the shape of "ABC" letters. Said so-obtained magnetically induced orientation pattern was, partially simultaneously with the magnetic orientation, fixed by UV-curing as described hereabove. This was achieved by exposing the assembly (1100) to the UV-LED-lamp during 2 seconds at the end of the last pass, said assembly (1100) being subsequently removed from the field generated by the magnetic-field-generating device (1160).

Figure 11D:
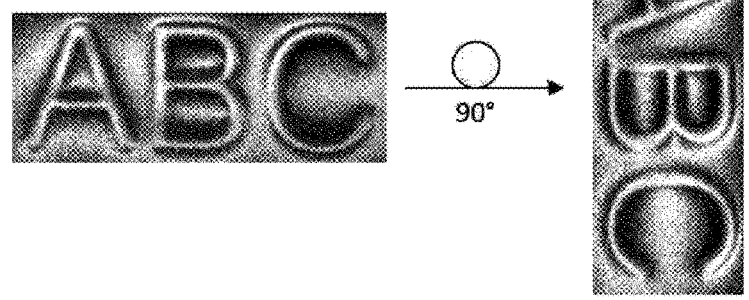
FIG. 11D photographic images of the OEL obtained by using the process shown in FIG. 11B-C.

FIG. 11D shows images of E7 at two viewing directions (90° angle) and obtained as described hereabove. Indicia having the shape of "ABC" letters appeared as a tridimensional object showing an effect protruding from the surface of the OEL. The perceived 3D-effect and the brightness of the so-obtained OEL was identical at all viewing directions.

Example E8 (FIGS. 12A-D)

Indicia having the shape of "ABC" letters were magnetically transferred by moving an assembly (1200) comprising a) a substrate (1210) carrying a coating layer (1220) and b) an arrangement (1230) comprising a non-magnetic holder (not shown) made of POM and negative indicia in the form of a soft magnetic composite plate (1250) comprising voids (1251) having the shape of "ABC" letters into a magneticfield-generating device (1260), wherein soft magnetic composite plate (1250) was attached to the non-magnetic holder with glue.

The non-magnetic holder (1240) was similar to one used for E4, i.e. was square-shaped (A1=A2=30 mm; thickness A3=1 mm) and the soft magnetic composite plate (1250) had the same composition as E4.

The soft magnetic composite plate (1250) was prepared by thoroughly mixing the ingredients of Table 2 during three minutes in a speed mixer (Flack Tek Inc DAC 150 SP) at 2500 rpm. The mixture was then poured in a silicon mould and left three days to be completely hardened. The so-obtained soft magnetic composite plate (1250) had the dimensions A4=34 mm, A5=20 mm and A6=2 mm, as indicated in FIG. 12A.

Indicia having the shape of "ABC" letters were mechanically cut-out in the so-obtained soft magnetic composite plate (1250) by using a 0.5 mm diameter mesh (computer-controlled mechanical engraving machine, IS500 from Gravograph).

A coating layer (1220) (A7=34 mm and A8=20 mm) made of the UV-curable screen printing ink described in Table 1 was applied onto the substrate (1210) and the coated substrate was arranged on top of the arrangement comprising the negative indicia in the form of the soft magnetic composite plate (1250) comprising voids (1251) and the non-magnetic holder, the coating layer (1220) facing the environment and the soft magnetic composite plate (1250) being attached above the non-magnetic holder.

Figure 12A:
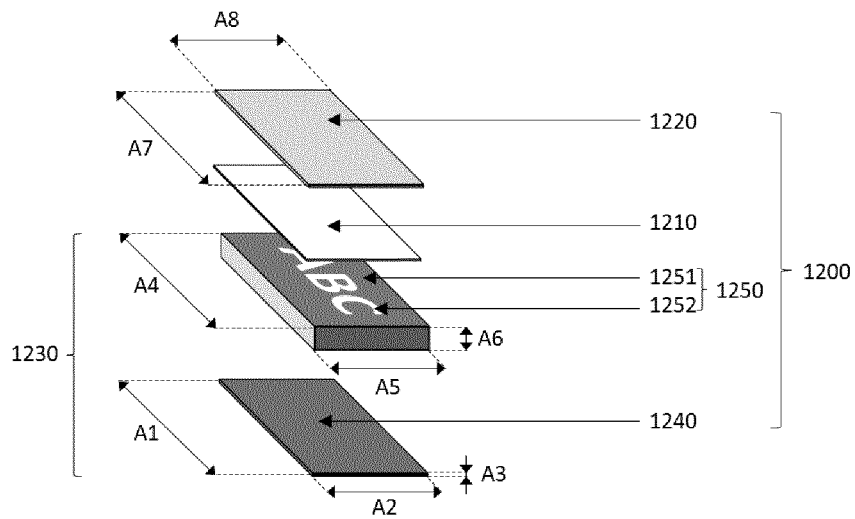
FIG. 12A schematically illustrates an assembly (1200) comprising a) a substrate (1210) carrying a coating layer (1220) made of a coating composition comprising platelet-shaped magnetic or magnetizable pigment particles and b) an arrangement (1230) comprising a non-magnetic holder (1240) and negative indicia in the form of a soft magnetic composite plate (1250) comprising voids (1251) having the shape of the indicia.

The so-obtained assembly (1200) is shown in an exploded view in FIG. 12A only for illustration purposes since there was no gap between the non-magnetic holder and the soft magnetic composite plate (1250) and there was no gap between the soft magnetic composite plate (1250) and the substrate (1210).

Figure 12B:
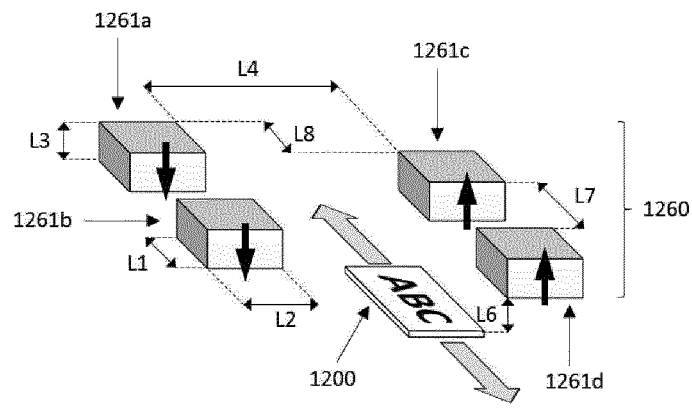
FIG. 12B-C schematically illustrates a process according to the invention for magnetically transferring one or more indicia into a coating layer (1220) so as to produce an optical effect layer (OEL), wherein the assembly (1200) of FIG. 12A is moved through a magnetic-field-generating device (1260) so as to bi-axially orient at least a part of the platelet-shaped magnetic or magnetizable pigment particles.
Figure 12C:
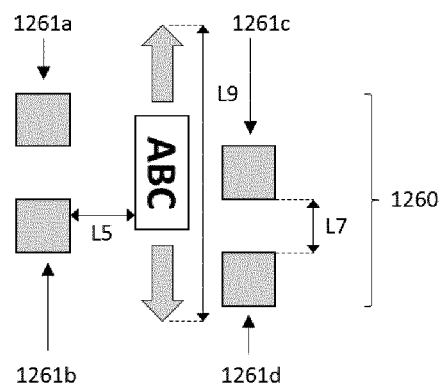

As shown in FIG. 12B-C, the platelet-shaped optically variable magnetic pigment particles were magnetically oriented by transferring the assembly (1200) described hereabove to the magnetic field of the magnetic-field-generating device (1260) comprising four permanent magnets made (1261a, 1261b, 1261c and 1261d) made of NdFeB N45 (Webcraft AG, L1=20 mm, L2=50 mm, L3=10 mm), wherein each of said four permanent magnets (1261a, 1261b, 1261c and 1261d) had its magnetic axis perpendicular to the substrate (1220), i.e. being magnetized along the dimension L3, and wherein the first and second permanent magnets made (1261a, 1261b) had the same magnetic direction pointing in the opposite direction to the third and fourth permanent magnets made (1261c, 1261d). The four permanent magnets (1261a, 1261b, 1261c and 1261d) were disposed in a staggered configuration, the column formed by the third (1261c) and fourth (1261d) permanent magnets being offset by a distance L8=20 mm along the L1 dimension compared to the column formed by the first (1261a) and second (1261b) permanent magnets, the distance (L4) between both said columns of permanent magnets being 48 mm and the distance (L7) between the permanent magnets in each column being 20 mm.

As shown in FIG. 12B-C, the assembly (1200) was placed below the four permanent magnets (1261a, 1261b, 1261c and 1261d) at a vertical distance L6=10 mm from the bottom surface of said four permanent magnets (1261a, 1261b, 1261c and 1261d) and at an horizontal distance L5=23 mm from the column formed by the first (1241a) and second (1241b) permanent magnets, the top and bottom sides of the indicia facing the distance L1 of the four permanent magnets (1261a, 1261b, 1261c and 1261d).

The assembly (1200) was moved (see arrows) back and forth eight times at a linear speed of 10 cm/s in the magnetic field generated by the magnetic-field-generating device (1260) and in a direction parallel to the dimension L1 of said four permanent magnets (1261a, 1261b, 1261c and 1261d). The total extent of the movement (L9) was about 160 mm so as to magnetically transfer the indicia to the not yet hardened coating composition.

The so-obtained magnetic orientation pattern of the platelet-shaped optically variable pigment particles led to an OEL exhibiting indicia having the shape of "ABC" letters. Said so-obtained magnetically induced orientation pattern was, partially simultaneously with the magnetic orientation, fixed by UV-curing as described hereabove. This was achieved by exposing the assembly (1200) to the UV-LED-lamp during 2 seconds at the end of the last pass, said assembly (1200) being subsequently removed from the field generated by the magnetic-field-generating device (1260).

Figure 12D:
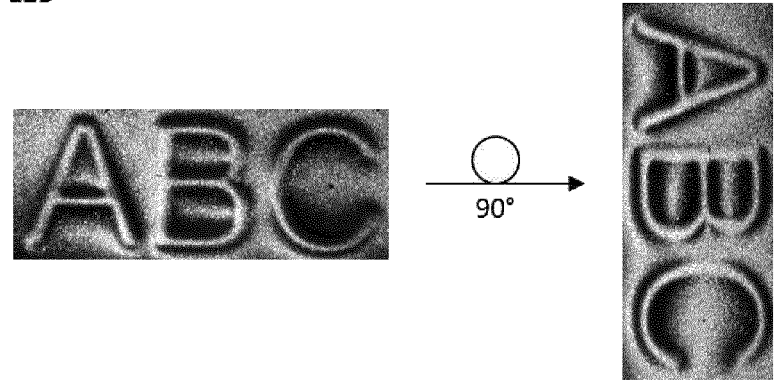
FIG. 12D photographic images of the OEL obtained by using the process shown in FIG. 12B-C.

FIG. 12D shows images at two viewing directions (90° angle) and obtained as described hereabove. Indicia having the shape of "ABC" letters appeared as a tridimensional object showing an effect protruding from the surface of the OEL. The perceived 3D-effect and the brightness of the so-obtained OEL was identical at all viewing directions.

The invention claimed is:

1. A process for producing an optical effect layer exhibiting one or more indicia on a substrate, said process comprising the steps of:
   a) applying onto a substrate surface a coating composition comprising i) platelet-shaped magnetic or magnetizable pigment particles and ii) a binder material so as to form a coating layer on said substrate, said coating composition being in a first state,
   b) forming an assembly comprising the substrate carrying the coating layer and one or more negative indicia or one or more positive indicia, wherein the substrate carrying the coating layer is arranged above the one or more negative indicia or one or more positive indicia, wherein the one or more negative indicia is made of a composite comprising from about 25 wt-% to about 95 wt-% of soft magnetic particles dispersed in a non-magnetic material, the weight percents being based on the total weight of the composite, and the one or more positive indicia consist of an arrangement comprising one or more indicia placed or attached to a non-magnetic holder, said indicia being made of a composite comprising from about 25 wt-% to about 95 wt-% of soft magnetic particles dispersed in a non-magnetic material, the weight percents being based on the total weight of the composite,
   c) moving the assembly comprising the substrate carrying the coating layer and the one or more negative indicia or one or more positive indicia obtained under step b) through an inhomogeneous magnetic field of a static magnetic-field-generating device so as to bi-axially orient at least a part of the platelet-shaped magnetic or magnetizable pigment particles, thereby magnetically transferring the one or more indicia from the soft magnetic plate or the non-magnetic holder into the coating layer,
   d) hardening the coating composition to a second state so as to fix the platelet-shaped magnetic or magnetizable pigment particles in their adopted positions and orientations, and e) releasing or separating the substrate from the one or more negative indicia or one or more positive indicia, while the one or more transferred indicia remain in the coating layer.

2. The process according to claim 1, wherein the coating layer represents the topmost layer of the assembly.

3. The process according to claim 1, wherein the non-magnetic material of the composite is a polymeric matrix comprising either thermoplastic materials selected from the group consisting of polyamides, co-polyamides, polyphtalimides, polyolefins, polyesters, polytetrafluoroethylenes, polyacrylates, polymethacrylates, polyimides, polyetherimides, polyetheretherketones, polyaryletherketones, polyphenylene sulfides, liquid crystal polymers, polycarbonates and mixtures thereof or a thermosetting material selected from the group consisting of epoxy resins, phenolic resins, polyimide resins, silicon resins and mixtures thereof.

4. The process according to claim 1, wherein the soft magnetic particles are selected from the group consisting of carbonyl iron, carbonyl nickel, cobalt and combinations thereof.

5. The process according to claim 1, wherein the soft magnetic particles have a d50 between about 0.5 µm and about 100 µm.

6. The process according to claim 1, wherein the step d) of hardening the coating composition is carried out partially simultaneously with the step c).

7. The process according to claim 1, wherein the magnetic-field-generating device is a linear permanent magnet Halbach array.

8. The process according to claim 1, wherein the platelet-shaped magnetic or magnetizable pigment particles are platelet-shaped optically variable magnetic or magnetizable pigment particles selected from the group consisting of platelet-shaped magnetic thin-film interference pigment particles, platelet-shaped magnetic cholesteric liquid crystal pigment particles, platelet-shaped interference coated pigment particles comprising a magnetic material and mixtures of two or more thereof.

9. The process according to claim 1, wherein the substrate is selected from the group consisting of papers, fibrous materials, paper-containing materials, glasses, metals, ceramics, plastics and polymers, metalized plastics, metalized polymers, composite materials or combinations thereof.

10. A method of manufacturing a security document or a decorative element or object, comprising:
   a) providing a security document or a decorative element or object, and
   b) providing an optical effect layer created according to the process of claim 1 and attaching the optical effect layer to the security document or decorative element or object.

11. The process according to claim 1, wherein any element arranged below the one or more negative indicia or one or more positive indicia is non-magnetic.

12. The process according to claim 1, wherein the magnetic-field-generating device is located laterally along one side of the assembly.

13. The process according to claim 1, wherein the act of moving the assembly through an inhomogeneous magnetic field of a static magnetic-field-generating device is performed by moving the assembly linearly beside the magnetic-field-generating device.

14. The process according to claim 1, wherein the optical effect layer resulting from the process exhibits one or more indicia having a three dimensional effect and a brightness that are both identical from all viewing directions.

15. The process according to claim 14, wherein at least one of the one or more indicia exhibited by the optical effect layer is a character.

16. The process according to claim 1, wherein the one or more indicia are the one or more positive indicia.

17. The process according to claim 1, wherein the one or more indicia are the one or more negative indicia.

* * * * *